US011354913B1

(12) United States Patent
Houston et al.

(10) Patent No.: US 11,354,913 B1
(45) Date of Patent: Jun. 7, 2022

(54) SYSTEMS AND METHODS FOR IMPROVING VEHICLE PREDICTIONS USING POINT REPRESENTATIONS OF SCENE

(71) Applicant: Woven Planet North America, Inc., Los Altos, CA (US)

(72) Inventors: John Rogers Houston, Los Altos, CA (US); Matthew Swaner Vitelli, San Francisco, CA (US)

(73) Assignee: Woven Planet North America, Inc., Los Altos, CA (US)

(*) Notice: Subject to any disclaimer, the term of this patent is extended or adjusted under 35 U.S.C. 154(b) by 12 days.

(21) Appl. No.: 16/698,307

(22) Filed: Nov. 27, 2019

(51) Int. Cl.
*G06V 20/58* (2022.01)
*G06T 15/08* (2011.01)
(Continued)

(52) U.S. Cl.
CPC .......... *G06V 20/58* (2022.01); *G06K 9/6267* (2013.01); *G06N 3/08* (2013.01); *G06T 15/08* (2013.01); *G06T 17/05* (2013.01)

(58) Field of Classification Search
CPC .. G06K 9/00805; G06K 9/6267; G06T 17/05; G06T 15/08; G06N 3/08; G08G 1/096708–096725; G08G 1/16; G08G 1/161–168; B60W 30/09; B60W 30/00; B60W 50/0097; B60W 50/14; B60R 21/013; B60R 21/0132; B60R 21/0134; B60R 2021/01302–01317; G06V 20/58
See application file for complete search history.

(56) References Cited

U.S. PATENT DOCUMENTS 6,405,132 B1 * 6/2002 Breed ................... G01S 7/4802
701/301
8,587,418 B2 * 11/2013 Mochizuki ............. G08G 1/161
340/435
(Continued)

FOREIGN PATENT DOCUMENTS

JP        2009014502 A    1/2009
KR     20180020615 A    2/2018
WO  WO 2019094863 A1  5/2019

OTHER PUBLICATIONS

International Search Report and Written Opinion for International Application No. PCT/US2020/062463, dated Mar. 15, 2021.

*Primary Examiner* — Michael S Osinski
(74) *Attorney, Agent, or Firm* — Christopher G. Darrow; Darrow Mustafa PC

(57) ABSTRACT

In one embodiment, a method includes, by a computing system associated with a vehicle, receiving sensor data from one or more sensors of the vehicle, wherein the sensor data is based on an environment of the vehicle, identifying, based on the sensor data, one or more objects in the environment, generating, based on the one or more objects, a set of points that represent the environment, wherein each object has one or more corresponding points in the set of points, and each of the points is associated with one or more features associated with the corresponding object, generating a prediction for at least one of the objects in the environment or the vehicle by processing the set of points using a machine-learning model, and causing the vehicle to perform one or more operations based on the prediction.

20 Claims, 15 Drawing Sheets

(51) Int. Cl.
*G06N 3/08* (2006.01)
*G06K 9/62* (2022.01)
*G06T 17/05* (2011.01)

(56) References Cited

U.S. PATENT DOCUMENTS

| | | | | |
|---|---|---|---|---|
| 9,182,761 | B2* | 11/2015 | Fujita | G05D 1/0212 |
| 9,470,790 | B2* | 10/2016 | Inomata | G01S 13/931 |
| 10,402,687 | B2* | 9/2019 | Anthony | G05D 1/0088 |
| 10,710,579 | B2* | 7/2020 | Lo | G08G 1/165 |
| 10,836,336 | B2* | 11/2020 | Ostling | B60R 21/0134 |
| 2014/0236483 | A1* | 8/2014 | Beaurepaire | G08G 1/168 |
| | | | | 701/533 |
| 2016/0057335 | A1* | 2/2016 | Pisz | H04N 5/23229 |
| | | | | 348/149 |
| 2017/0160743 | A1* | 6/2017 | Schweikl | G08G 1/056 |
| 2017/0270374 | A1* | 9/2017 | Myers | G06K 9/00369 |
| 2018/0203460 | A1 | 7/2018 | Joho | |
| 2018/0314247 | A1* | 11/2018 | Sun | G06Q 10/047 |
| 2018/0345958 | A1* | 12/2018 | Lo | G08G 1/096725 |
| 2019/0049987 | A1 | 2/2019 | Djuric | |
| 2019/0161080 | A1* | 5/2019 | Gochev | G08G 1/163 |
| 2019/0308554 | A1* | 10/2019 | Tsu | G06V 20/58 |
| 2019/0392231 | A1* | 12/2019 | Dean | G06K 9/00818 |
| 2020/0125112 | A1* | 4/2020 | Mao | G06K 9/6289 |
| 2020/0210721 | A1* | 7/2020 | Goel | G06N 3/04 |
| 2020/0211377 | A1* | 7/2020 | Chen | G08G 1/052 |
| 2020/0250837 | A1* | 8/2020 | Fagg | G05D 1/0246 |
| 2020/0364876 | A1* | 11/2020 | Mohan | G06F 3/0346 |
| 2020/0369149 | A1* | 11/2020 | Kassn | G06T 11/001 |
| 2021/0004611 | A1* | 1/2021 | Garimella | G06K 9/00798 |
| 2021/0081681 | A1* | 3/2021 | Chiba | G06K 9/6271 |
| 2021/0103285 | A1* | 4/2021 | Philbin | G05D 1/0214 |
| 2021/0155248 | A1* | 5/2021 | Cox | B60W 40/06 |
| 2021/0157325 | A1* | 5/2021 | Beller | G05D 1/0223 |
| 2021/0166049 | A1* | 6/2021 | Tariq | G06K 9/00791 |
| 2021/0171025 | A1* | 6/2021 | Ishikawa | G08G 1/166 |
| 2021/0182911 | A1* | 6/2021 | Xiao | B60W 10/08 |
| 2021/0183249 | A1* | 6/2021 | Beauchamp | G01S 5/0294 |
| 2021/0188273 | A1* | 6/2021 | Katriniok | G08G 1/161 |
| 2021/0188292 | A1* | 6/2021 | Niem | G06K 9/0063 |
| 2021/0192273 | A1* | 6/2021 | Pfeiffer | G06N 20/00 |
| 2021/0208598 | A1* | 7/2021 | Ghafarianzadeh | G05D 1/0221 |

* cited by examiner

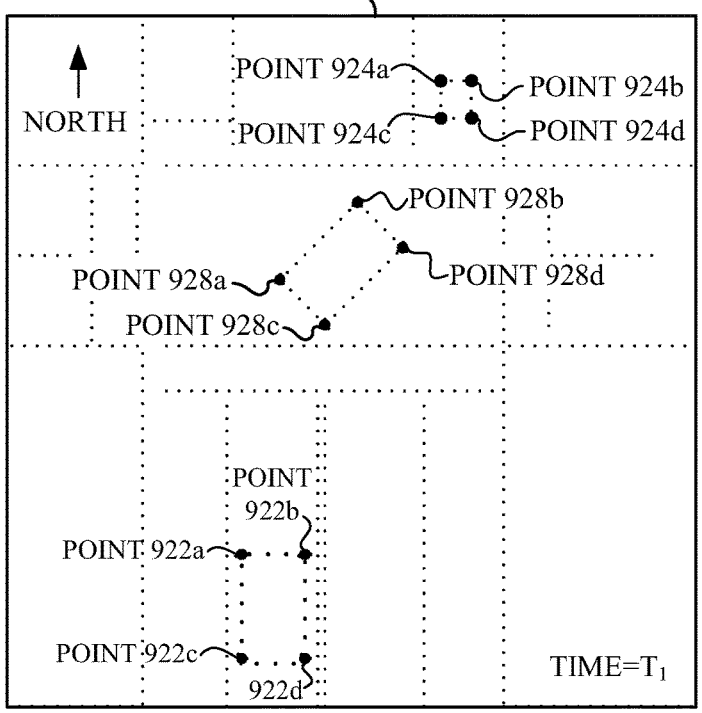

POINT CLOUD VISUALIZATION AT TIME $T_1$
940

TIME=$T_1$

*FIG. 9C*

POINT CLOUD FOR TIME
INTERVAL $T_0$ to $T_1$
950

| | |
|---|---|
| POINT 922a | (21, 62), car |
| POINT 922b | (27, 62), car |
| POINT 922c | (21, 72), car |
| POINT 922d | (27, 72), car |
| | |
| POINT 924a | (41, 25), ped. |
| POINT 924b | (44, 25), ped. |
| POINT 924c | (41, 29), ped. |
| POINT 924d | (44, 29), ped. |
| | |
| POINT 928a | (24, 48), car |
| POINT 928b | (30, 35), car |
| POINT 928c | (28, 52), car |
| POINT 928d | (34, 45), car |
| POINT 902a | (21, 53), car |
| POINT 902b | (26, 53), car |
| POINT 902c | (21, 63), car |
| POINT 902d | (26, 63), car |
| | |
| POINT 904a | (38, 57), car |
| POINT 904b | (43, 57), car |
| POINT 904c | (38, 67), car |
| POINT 904d | (43, 67), car |
| | |
| POINT 910a | (30, 6), car |
| POINT 910b | (35, 6), car |
| POINT 910c | (30, 16), car |
| POINT 910d | (35, 16), car |
| | |
| POINT 914a | (45, 25), ped. |
| POINT 914b | (48, 25), ped. |
| POINT 914c | (45, 28), ped. |
| POINT 914d | (48, 28), ped. |
| | |
| POINT 918a | (40, 35), car |
| POINT 918b | (49, 33), car |
| POINT 918c | (42, 40), car |
| POINT 918d | (51, 38), car |
| | |
| POINT 906 | (19, 70), left-lane |
| POINT 908 | (29, 79), right-lane |

SYSTEMS AND METHODS FOR IMPROVING VEHICLE PREDICTIONS USING POINT REPRESENTATIONS OF SCENE

BACKGROUND

A modern vehicle may include one or more sensors or sensing systems for monitoring the vehicle and environment. For example, the vehicle may use speed sensors to measure the vehicle speed and may use a GPS to track the location of the vehicle. One or more cameras or LiDAR may be used to detect objects in the environment surrounding the vehicle. The vehicle may use one or more computing systems (e.g., an on-board computer) to collect and process data from the sensors. The computing systems may store the collected data in on-board storage space or upload the data to a cloud using a wireless connection and may perform processing tasks on the data to operate the vehicle.

However, the sensors of the vehicle may generate large amounts of data and the computing system of the vehicle may have limited on-board resources, such as power, processing capacity and storage space, available to perform the processing tasks involved in operating the vehicle. Moreover, due to the speed at which vehicles are moving, operational decisions need to be made within stringent timing requirements. Thus, the computational budget available for making operational decisions at the requisite frequency is extremely limited.

BRIEF DESCRIPTION OF THE DRAWINGS

FIG. 9C illustrates an example visualization of a point cloud at a first subsequent time.

FIG. 9D illustrates an example point cloud at a first subsequent time.

DESCRIPTION OF EXAMPLE EMBODIMENTS

Figure 1:
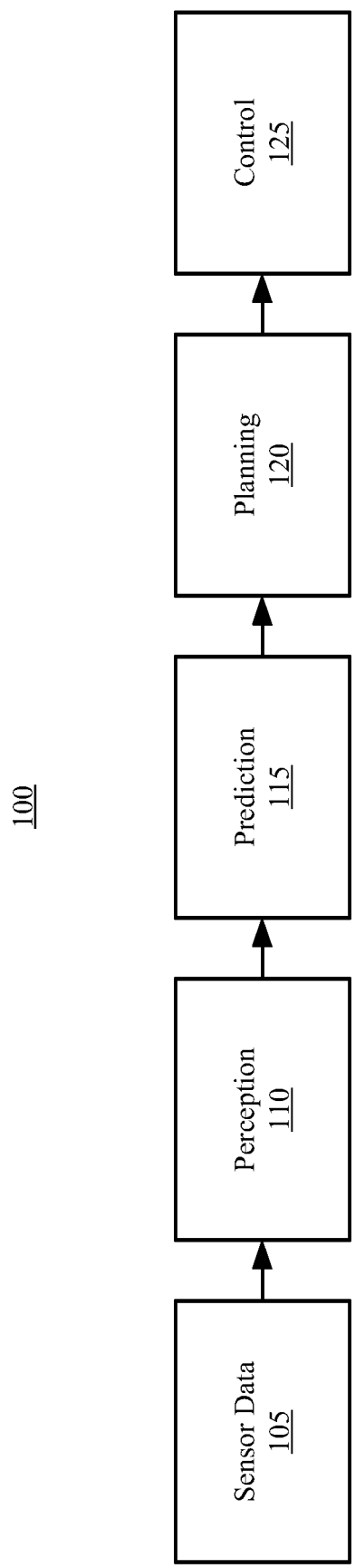
FIG. 1 illustrates an example block diagram of an algorithmic navigation pipeline.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In existing vehicle systems, image-based prediction systems may be used to make predictions about obstacles in the environment, such as predicted trajectories of the obstacles. The predictions may be made using Convolutional Neural Networks (CNNs), which can learn spatial relations from training image data. Trained CNNs can be used to make predictions based on rasterized images of the vehicle environment. The rasterized images may be top-down images generated from camera images captured by the vehicle's cameras.

Such existing image-based solutions to vehicle planning problems can be computationally wasteful. The rasterization process and the operations performed by image-based neural networks, such as image transformations and convolutions in CNNs, may consume a substantial portion of the vehicle's CPU, GPU, and memory resources. A single frame of color video may consume one megabyte of memory (at 300×300 pixel resolution), for example. The rasterization and inference operations may be performed numerous times on the frame, e.g., 50 times for a scene having 50 obstacles. When the contextual environment of a vehicle is represented using an image, a significant portion of the image may depict areas of the environment that have little relevance to the subsequent planning stage, such as buildings, sidewalks, the sky, and so on. Yet, those areas are still processed, which leads to computational waste. The resource-intensive nature of such image processing is a problem in vehicle systems because the computational resources on a vehicle are limited. The resources available in a vehicle may be limited by physical constraints on size, weight, power consumption, and heat output of the vehicle system's hardware. Using resources for tasks such as rasterization and convolutions in the CNN reduces the amount of resources available for other tasks, such as other stages of the CNN, which may perform higher-level operations, or for accuracy improvements.

To solve the problems associated with the computational demands of image-based predictions, a point-based prediction system may use sensor data to construct a "point cloud" containing a set of points that represent the vehicle's environment and use a prediction model to make predictions based on the point cloud. Thus, the point cloud may be generated instead of rasterizing an image, and predictions may be made using a point-based neural network (PBNN) instead of a CNN. The PBNN may be a neural network of fully-connected layers such PointNet, or the like. In particular embodiments, in a point cloud, a vehicle environment, including objects such as obstacles and the vehicle itself, may be represented as points. For example, there may be points that represent the orientation, location, and shape of each car, pedestrian, and street boundary near the vehicle. Each point may have x and y coordinates, and one or more feature values. Information, such as classifications of the objects represented by the points as a car, pedestrian, or street boundary, may be encoded in the feature values associated with the points. The PBNN may generate a prediction for each one of the objects represented in the point cloud. Each prediction may be, for example, a predicted trajectory, of the corresponding object.

In particular embodiments, a vehicle prediction system that uses a point-cloud representation of a vehicle's environment, as described herein, can be substantially more efficient than a system that uses images to represent the environment. Point clouds can use substantially less memory than image representations of scenes. Point clouds can include points that represent obstacles but need not include points for areas of the environment that have little relevance to the subsequent planning stage, such as buildings, sidewalks, the sky, and so on. In a point cloud, an irrelevant area need not consume storage space since the point cloud need not contain any points for the irrelevant area. As described above, a 300×300 pixel image of a scene may consume one megabyte of memory. By comparison, a 300×300 point representation a scene having 50 obstacles may use four points per obstacle. If each point consumes 128 bytes, then the scene may be represented using 26 kilobytes. Thus, using a PBNN can result in substantially-reduced processor and storage resource usage by the vehicle. These computational resources may then be used for other purposes, such as increasing sensor resolution and prediction accuracy.

FIG. 1 illustrates an example block diagram of an algorithmic navigation pipeline. In particular embodiments, an algorithmic navigation pipeline 100 may include a number of computing modules, such as a sensor data module 105, perception module 110, prediction module 115, planning module 120, and control module 125. Sensor data module 105 may obtain and pre-process sensor/telemetry data that is provided to perception module 110. Such data may be captured by any suitable sensors of a vehicle. As an example and not by way of limitation, the vehicle may have a Light Detection and Ranging (LiDAR) sensor that is configured to transmit pulsed laser beams in multiple directions and measure the reflected signal from objects surrounding vehicle. The time of flight of the light signals may be used to measure the distance or depth of the objects from the LiDAR. As another example, the vehicle may have optical cameras pointing in different directions to capture images of the vehicle's surrounding. Radars may also be used by the vehicle for detecting other vehicles and/or hazards at a distance. As further examples, the vehicle may be equipped with ultrasound for close range object detection, e.g., parking and obstacle detection or infrared cameras for object detection in low-light situations or darkness. In particular embodiments, sensor data module 105 may suppress noise in the sensor data or normalize the sensor data.

Perception module 110 is responsible for correlating and fusing the data from the different types of sensors of the sensor module 105 to model the contextual environment of the vehicle. Perception module 110 may use information extracted by multiple independent sensors to provide information that would not be available from any single type of sensors. Combining data from multiple sensor types allows the perception module 110 to leverage the strengths of different sensors and more accurately and precisely perceive the environment. As an example and not by way of limitation, image-based object recognition may not work well in low-light conditions. This may be compensated by sensor data from LiDAR or radar, which are effective sensors for measuring distances to targets in low-light conditions. As another example, image-based object recognition may mistakenly determine that an object depicted in a poster is an actual three-dimensional object in the environment. However, if depth information from a LiDAR is also available, the perception module 110 could use that additional information to determine that the object in the poster is not, in fact, a three-dimensional object.

Perception module 110 may process the available data (e.g., sensor data, data from a high-definition map, etc.) to derive information about the contextual environment. For example, perception module 110 may include one or more agent modelers (e.g., object detectors, object classifiers, or machine-learning models trained to derive information from the sensor data) to detect and/or classify agents present in the environment of the vehicle (e.g., other vehicles, pedestrians, moving objects). Perception module 110 may also determine various characteristics of the agents. For example, perception module 110 may track the velocities, moving directions, accelerations, trajectories, relative distances, or relative positions of these agents. In particular embodiments, the perception module 110 may also leverage information from a high-definition map. The high-definition map may include a precise three-dimensional model of the environment, including buildings, curbs, street signs, traffic lights, and any stationary fixtures in the environment. Using the vehicle's GPS data and/or image-based localization techniques (e.g., simultaneous localization and mapping, or SLAM), the perception module 110 could determine the pose (e.g., position and orientation) of the vehicle or the poses of the vehicle's sensors within the high-definition map. The pose information, in turn, may be used by the perception module 110 to query the high-definition map and determine what objects are expected to be in the environment.

Perception module 110 may use the sensor data from one or more types of sensors and/or information derived therefrom to generate a representation of the contextual environment of the vehicle. As an example and not by way of limitation, the representation of the external environment may include objects such as other vehicles, curbs, debris, objects, and pedestrians. The contextual representation may be limited to a maximum range of the sensor array (e.g., 50, 100, or 200 meters). The representation of the contextual environment may include information about the agents and objects surrounding the vehicle, as well as semantic information about the traffic lanes, traffic rules, traffic signs, time of day, weather, and/or any other suitable information. The contextual environment may be represented in any suitable manner. As an example and not by way of limitation, the contextual representation may be encoded as a vector or matrix of numerical values, with each value in the vector/matrix corresponding to a predetermined category of information. For example, each agent in the environment may be represented by a sequence of values, starting with the agent's coordinate, classification (e.g., vehicle, pedestrian, etc.), orientation, velocity, trajectory, and so on. Alternatively, information about the contextual environment may be represented by a raster image that visually depicts the agent, semantic information, etc. For example, the raster image may be a birds-eye view of the vehicle and its surrounding, up to a predetermined distance. The raster image may include visual information (e.g., bounding boxes, color-coded shapes, etc.) that represent various data of interest (e.g., vehicles, pedestrians, lanes, buildings, etc.).

The representation of the present contextual environment from the perception module 110 may be consumed by a prediction module 115 to generate one or more predictions of the future environment. For example, given a representation of the contextual environment at time to, the prediction module 115 may output another contextual representation for time ti. For instance, if the to contextual environment is represented by a raster image, the output of the prediction module 115 may be another raster image (e.g., a snapshot of the current environment) that depicts where the agents would be at time ti (e.g., a snapshot of the future). In particular embodiments, prediction module 115 may include a machine-learning model (e.g., a convolutional neural network, a neural network, a decision tree, support vector machines, etc.) that may be trained based on previously recorded contextual and sensor data. For example, one training sample may be generated based on a sequence of actual sensor data captured by a vehicle at times to and ti. The captured data at times to and ti may be used to generate, respectively, a first contextual representation (the training data) and a second contextual representation (the associated ground-truth used for training). During training, the machine-learning model may process the first contextual representation using the model's current configuration parameters and output a predicted contextual representation. The predicted contextual representation may then be compared to the known second contextual representation (i.e., the ground-truth at time ti). The comparison may be quantified by a loss value, computed using a loss function. The loss value may be used (e.g., via back-propagation techniques) to update the configuration parameters of the machine-learning model so that the loss would be less if the prediction were to be made again. The machine-learning model may be trained iteratively using a large set of training samples until a convergence or termination condition is met. For example, training may terminate when the loss value is below a predetermined threshold. Once trained, the machine-learning model may be used to generate predictions of future contextual representations based on current contextual representations.

Planning module 120 may determine the navigation routes and particular driving operations (e.g., slowing down, speeding up, stopping, swerving, etc.) of the vehicle based on the predicted contextual representation generated by the prediction module 115. In particular embodiments, planning module 120 may utilize the predicted information encoded within the predicted contextual representation (e.g., predicted location or trajectory of agents, semantic data, etc.) and any other available information (e.g., map data, traffic data, accident reports, weather reports, target destinations, and any other suitable information) to determine one or more goals or navigation instructions for the vehicle. As an example and not by way of limitation, based on the predicted behavior of the agents surrounding the vehicle and the traffic data to a particular destination, planning module 120 may determine a particular navigation path and associated driving operations for the vehicle to avoid possible collisions with one or more agents. In particular embodiments, planning module 120 may generate, based on a given predicted contextual presentation, several different plans (e.g., goals or navigation instructions) for the vehicle. For each plan, the planning module 120 may compute a score that represents the desirability of that plan. For example, if the plan would likely result in the vehicle colliding with an agent at a predicted location for that agent, as determined based on the predicted contextual representation, the score for the plan may be penalized accordingly. Another plan that would cause the vehicle to violate traffic rules or take a lengthy detour to avoid possible collisions may also have a score that is penalized, but the penalty may be less severe than the penalty applied for the previous plan that would result in collision. A third plan that causes the vehicle to simply stop or change lanes to avoid colliding with the agent in the predicted future may receive the highest score. Based on the assigned scores for the plans, the planning module 120 may select the best plan to carry out. While the example above used collision as an example, the disclosure herein contemplates the use of any suitable scoring criterial, such as travel distance or time, fuel economy, changes to the estimated time of arrival at the destination, passenger comfort, proximity to other vehicles, the confidence score associated with the predicted contextual representation, etc.

Based on the plan generated by planning module 120, which may include one or more navigation path or associated driving operations, control module 125 may determine the specific commands to be issued to the actuators of the vehicle. The actuators of the vehicle are components that are responsible for moving and controlling the vehicle. The actuators control driving functions of the vehicle, such as for example, steering, turn signals, deceleration (braking), acceleration, gear shift, etc. As an example and not by way of limitation, control module 125 may transmit commands to a steering actuator to maintain a particular steering angle for a particular amount of time to move a vehicle on a particular trajectory to avoid agents predicted to encroach into the area of the vehicle. As another example, control module 125 may transmit commands to an accelerator actuator to have the vehicle safely avoid agents predicted to encroach into the area of the vehicle.

Figure 2:
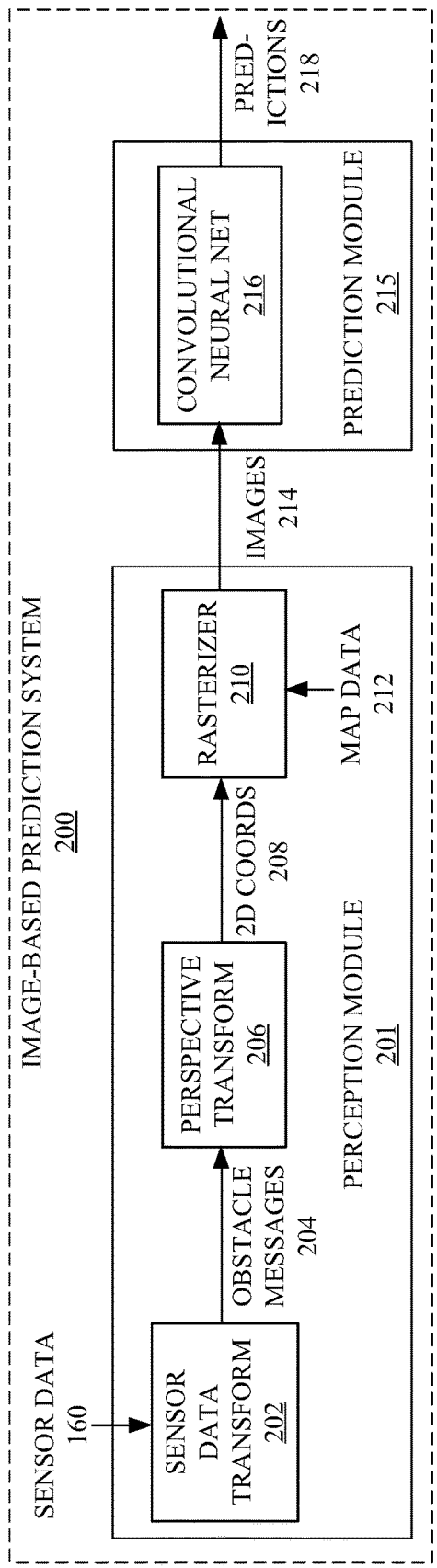
FIG. 2 illustrates an example image-based prediction system.

FIG. 2 illustrates an example image-based prediction system 200. The image-based prediction system 200 may be used in existing vehicle systems to make predictions 218 related to vehicle operations, such as predicted vehicle trajectories, based on camera images. Existing prediction models use image-based neural networks, such as Convolutional Neural Networks (CNNs) 216, which learn spatial relations in rasterized images 214 by performing mathematical operations on the images 214. The image-based neural networks can then make predictions based on other images, such as images captured at subsequent times by vehicle cameras. CNNs have neuron connectivity patterns similar to those in the human visual cortex, and are useful for analysis of the visual images such as those collected by cameras on vehicles.

The images used in vehicle systems may be relatively large. For example, a 300×300 pixel image that has 90,000 pixels may occupy approximately 1 megabyte of memory at 12 bytes per pixel (red, green, and blue values of 4 bytes each). An image showing a top-down view, which may be generated by rasterizing camera images and used as input to a CNN, may also use approximately 1 megabyte of memory. The rasterization process and the operations performed by image-based neural networks, such as image transformations and convolutions in CNNs, may consume a substantial portion of the CPU, GPU, and memory resources available in a vehicle system. For example, CNNs may include spatial transformer networks (STNs) that perform computationally-expensive operations such as bilinear interpolation on input images. Further, a substantial amount of communication bandwidth may be consumed if the images are sent to servers via a network, e.g., to perform computations on remote processors.

Increasing the resolution of the image can improve accuracy of the predictions. However, relatively small increases in image resolution can result in a much larger increase in vehicle system resource usage. The size of the images may grow as the width or height of the images grow, so a 500×500 image may consume 1 megabyte, while an 800×800 image may consume 2.5 megabytes. Thus, increasing the image resolution can substantially increase the amount of computation needed to rasterize the image and perform convolutions on the rasterized image.

This use of a substantial portion of the vehicle's computational resources by portions of the CNN and related operations is a problem in vehicle systems because the computational resources on a vehicle are limited. The resources available in a vehicle may be limited by physical constraints on size, weight, power consumption, and heat output of the vehicle system's hardware. Using resources for tasks such as rasterization and convolutions in the CNN reduces the amount of resources available for other tasks, such as other stages of the CNN, which may perform higher-level operations, or for accuracy improvements. Increasing the accuracy or robustness of predictions may involve, for example, increasing image resolution, image capture and processing rate, or the size of the neural network, as well as adding more CNN processes, implementing different algorithms, and so on. However, the processing capacity needed for such improvements may be unavailable at least in part because the processing capacity is used by the CNN and related operations.

Referring to FIG. 2, the image-based prediction system 200 may include a perception module 201 and a prediction module 215. The perception module 201 may receive sensor data 160, e.g., from a sensor data module 105, and may generate one or more images 214 based on the sensor data 160. The prediction module 215 may receive the images 214 and generate one or more predictions 218 based on the images 214 using a CNN 216. Each prediction 218 may include predicted locations or trajectories of obstacles such as vehicles and pedestrians, for example.

Figure 7:
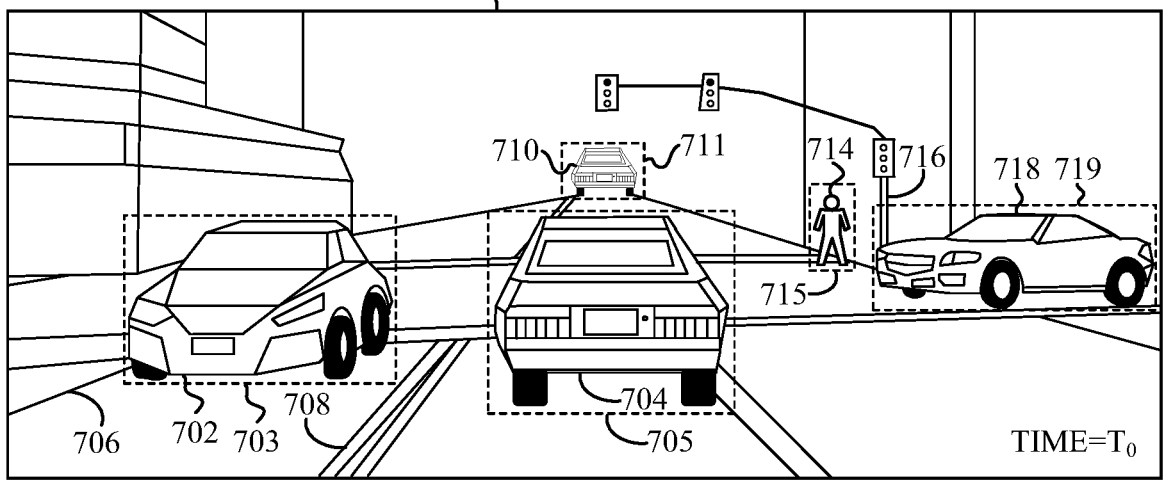
FIG. 7 illustrates an example vehicle environment.

The perception module 201 may include a sensor data transform 202, a perspective transform 206, and a rasterizer 210. The sensor data transform 202 may transform the sensor data 160 to obstacle messages 204 or other suitable representation. The obstacle messages 204 may be data items that describe physical obstacles or other physical objects in the environment near the vehicle. Each of the obstacle messages 204 may include a spatial representation of a corresponding physical obstacle, e.g., a representation of a bounding box of the physical obstacle, and information about the classification of the physical obstacle, e.g., as being a car, a pedestrian, or the like. The representation of the bounding box may be three-dimensional positions of corners of the bounding box, e.g., (x, y, z), coordinates or distances specified in units such as meters. Example bounding boxes are shown in FIG. 7.

Figure 8:
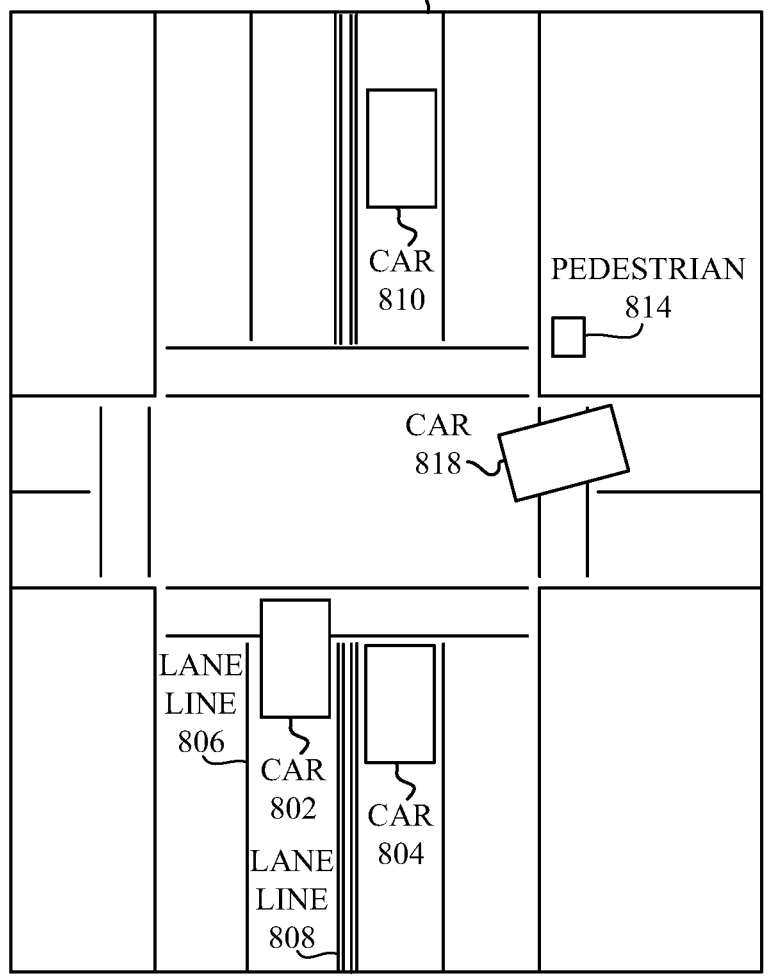
FIG. 8 illustrates an example image depicting a vehicle environment.

For each of the obstacle messages 204, the perspective transform 206 may convert the bounding box coordinates specified by the obstacle message 204 to two-dimensional raster pixel coordinates of a top-down view. The top-down view may be a bird's-eye view of the environment near the vehicle, and may include depictions of the vehicle, obstacles, and streets. To generate the top-down view, each bounding box may be converted to two-dimensional (x, y) coordinates 208 of points that are corners of a rectangle (or other type of polygon). The rectangle may represent the size, shape, orientation, and location of the corresponding physical obstacle in the top-down view. The top-down view may be generated using a rasterizer 210, which may rasterize the 2D coordinates 208 to form the images 214 depicting the top-down view. An example image of a top-down view in which obstacles are depicted as rectangles is shown in FIG. 8. Each of the images 214 may have a resolution of, for example, 300×300 pixels, or other suitable resolution. Each raster image 214 may be generated by, for each obstacle message 204, drawing each of the 2D points produced by the perspective transform 206 in the image 214. Lines may be drawn between the points of each obstacle to form a rectangle in the image 214, and the rectangle may be filled in with a particular color using a fill operation.

In particular embodiments, the rasterizer 210 may use map data 212 to draw streets and other map features in the images 214. The map data 212 may be a set of structured data representing a map. For example, the rasterizer 210 may query the map data 212 for street lane segments having geographical locations that are within the boundaries of the geographical area represented by image 214. For each lane, the left and right lane boundaries may be drawn, e.g., by drawing points in the image 214. A polygon fill operation may be used to fill in the street with a particular color. The images 214 may be provided as input to the CNN 216, which may generate one or more predictions 218 based on the images 214 as described above.

Figure 3:
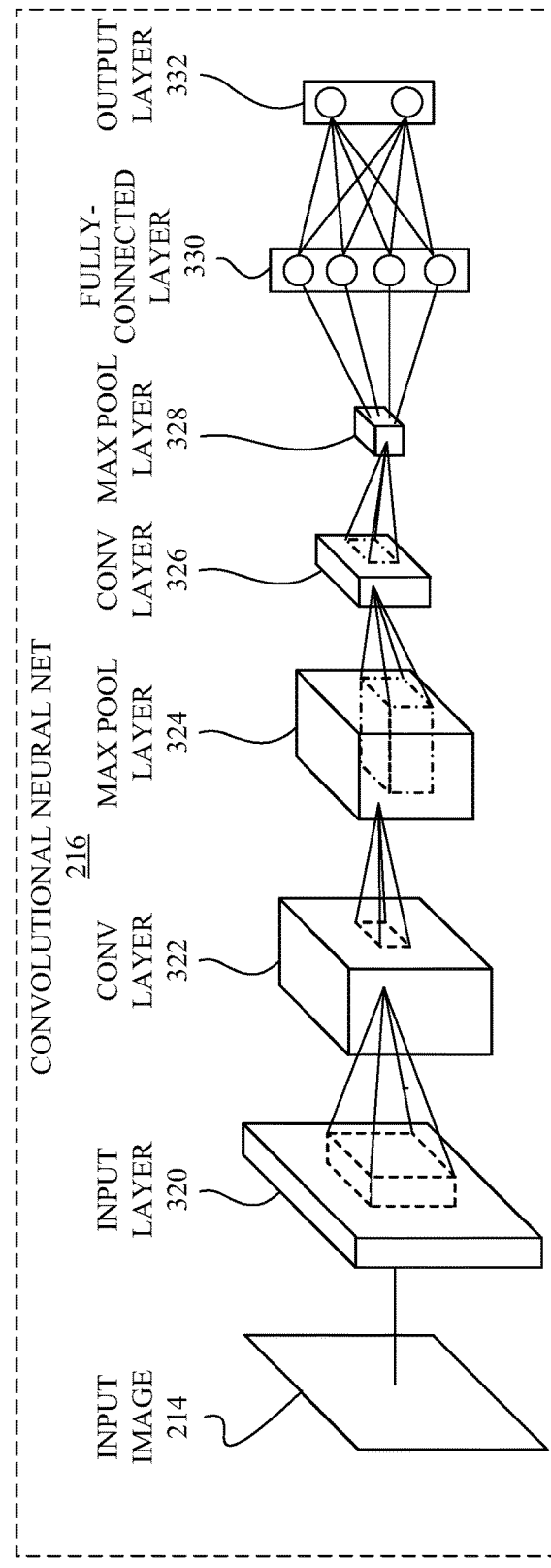
FIG. 3 illustrates an example convolutional neural network.

FIG. 3 illustrates an example convolutional neural network (CNN) 216. The CNN 216 processes one or more input images 214 and produces activations in an output layer 332 that correspond to predictions. The CNN 216 may be understood as a type of neural network that uses convolution operations instead of matrix multiplication in at least one of its layers. The convolution operation is a sliding dot-product used to combine multiple input values (also referred to as neurons) in a sliding window-like area of a convolutional layer's input to form fewer output values. Each convolutional layer may have an activation function such as RELU or the like. Each layer of the CNN 216 may transform a matrix of input values to a smaller matrix of output values. The CNN 216 includes an input layer 320, which receives the input images 214, a first convolutional layer 322, which performs convolutions on the input layer 320, a first max pool layer 324, which performs max pool operations that reduce the dimensions of the output of the first convolutional layer 322 by selecting maximum values from clusters of values, a second convolutional layer 326, which performs convolutions on the output of the max pool layer 324, a second max pool layer 328, which performs max pool operations on the output of the second convolutional layer 326, a fully-connected layer 330 which receives the output of the second max pool layer 328 and produces an output that includes a number (k) values, shown as an output layer 332. The values in the output layer 332 may correspond to a prediction 218 generated based on the input images 214.

Figure 4A:
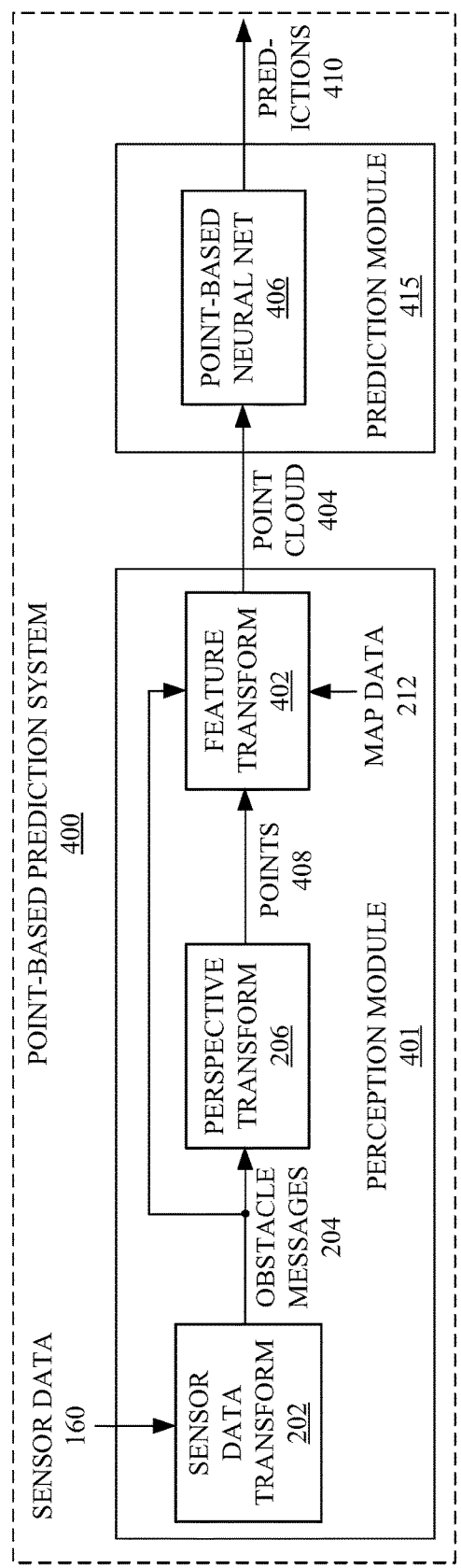
FIG. 4A illustrates an example point-based prediction system.

FIG. 4A illustrates an example point-based prediction system 400. To solve the problems associated with the computational demands of image-based predictions, the point-based prediction system 400 may include a perception module 401 that uses sensor data 160 to construct a "point cloud" 404 containing a set of points that represent the vehicle's environment, and use a prediction module 415 to make predictions 410 based on the point cloud 404. The perception module 401 may include a sensor data transform 202, a perspective transform 206, which may transform obstacle messages 204 to points 408, and a feature transform 402, which may transform the points 408 and map data 212 to form the point cloud 404. The prediction model 415 may include a point-based neural network (PBNN) 406, which may generate the predictions 410 based on the point cloud 404. The PBNN 406 may be a neural network of fully-connected layers such PointNet or the like. Thus, in comparison to the image-based prediction system 200, the point cloud 404 may be generated instead of generating an image 214, and predictions 410 may be made using the point-based neural network (PBNN) 406 instead of a CNN 216.

In particular embodiments, a vehicle prediction system 400 that uses a point-cloud representation of a vehicle's environment, as described herein, can be substantially more efficient than the image-based prediction system 200. The PBNN 406 may make predictions 410 using fewer computational resources than the CNN 216. A point cloud 404 representing a vehicle environment is ordinarily substantially smaller than an image 214 representing the same environment. The storage resources that were previously consumed by the images 214 can be used to increase the resolution and area of the environment represented by the point cloud 404, for example. Further, input alignment in a PBNN 406 can be performed using matrix multiplication instead of more computationally-expensive operations such as bilinear interpolation, which are performed by spatial transformer networks in image-based neural networks such as the CNN 216.

In particular embodiments, in a point cloud 404, a vehicle environment, including objects such as obstacles, may be represented as a set of points. For example, there may be points that represent the orientation, location, and shape of each car, pedestrian, and street boundary near the vehicle. Each point may have coordinates (e.g., x, y or x, y, z), and one or more associated feature values. Information, such as a classification of the object represented by the points as a car, pedestrian, or street boundary, may be encoded in the feature values associated with the points. The PBNN 406 may generate a prediction 410 for each one of the objects represented in the point cloud 404. Each prediction 410 may be, for example, a predicted trajectory, of the corresponding object. The point cloud 404 may be updated over time based on updated sensor data 160, and predictions 410 may be generated over time by the PBNN 406 based on updates to point cloud 404 that reflect the changing environment.

In particular embodiments, a vehicle system may receive sensor data 160 from one or more sensors, such as cameras, LiDAR, radar, or the like. The vehicle system may generate one or more object representations, such as obstacle messages 204, based on the perception data. The obstacle messages 204 may be produced by a sensor data transform 202 and may represent physical objects in the environment of the vehicle. An example environment is shown in FIG. 7. The object representations may include a spatial representation of each physical object as well as a classification of the type of the object, e.g., as a car, pedestrian, or the like. The spatial representation may be, e.g., a bounding box, which may be represented as three-dimensional points specified in the obstacle messages 204, or other suitable spatial representation. A point cloud 404 may be generated based on the object representations. A perspective transform 206 may transform the three-dimensional coordinates of each object to points 408. The resulting points 408 may include, e.g., two-dimensional points that represent the corners of a two-dimensional rectangle (or other type of polygon) in a top-down view such as that shown in FIG. 9A. Alternatively or additionally, the points 408 may include three-dimensional points, in which case the perspective transform 206 may be optional, and the points 408 may include the bounding-box coordinates from the obstacle messages 204. Alternatively or additionally, the perspective transform may convert three-dimensional bounding-box coordinates from the obstacle messages 204 to three-dimensional points 408 (e.g., in a different coordinate system than the bounding boxes, and/or with different units, a different origin, or the like). A feature transform 402 may transform features of each object representation, such as the obstacle's classification, heading, identifier, and so on, from each obstacle message 204, to corresponding values in the point cloud 404. For example, the feature transform 402 may store the object's classification as a feature value associated with the points. The points and their associated feature values may be added to a list of points that represents the point cloud 404.

In particular embodiments, the feature transform 402 may store additional information in the feature values associated with the points. Geographic and/or street map features that represent physical objects, such as streets, in the vehicle's environment may be identified in map data 212 retrieved from a map database. The vehicle system may transform the coordinates of each map feature to one or more points and add each point to the point cloud 404. For example, the locations of street lane boundaries in the environment, and information indicating whether the points of a lane boundary are relative to the center of the lane, the left lane, or the right lane, may be encoded as feature values associated with the points of the lane. The distances from objects to lane boundaries, positions and orientations of objects relative to other objects, object trajectory, and object speed, may also be stored as feature values for each object.

In particular embodiments, a machine-learning model may be trained and used to make predictions 410 about the objects in the environment, such as the obstacles identified by the obstacle messages 204. The machine-learning model may be, e.g., a neural network 406 having one or more fully-connected layers, such as a PointNet or the like. The neural network 406 may receive the point cloud 404 as input, and may produce, as output, activations that correspond to the predictions 410 as output. The predictions 410 may include predicted trajectories of the objects whose points are specified in the point cloud 404. Each prediction 410 may be, e.g., a predicted trajectory of at least one of the objects, and the prediction 410 may be generated based on output of the machine-learning model. The prediction system 400 may cause the vehicle to operate in accordance with the predicted trajectory, e.g., by using the object's predicted trajectory to avoid a collision with the object.

Figure 4B:
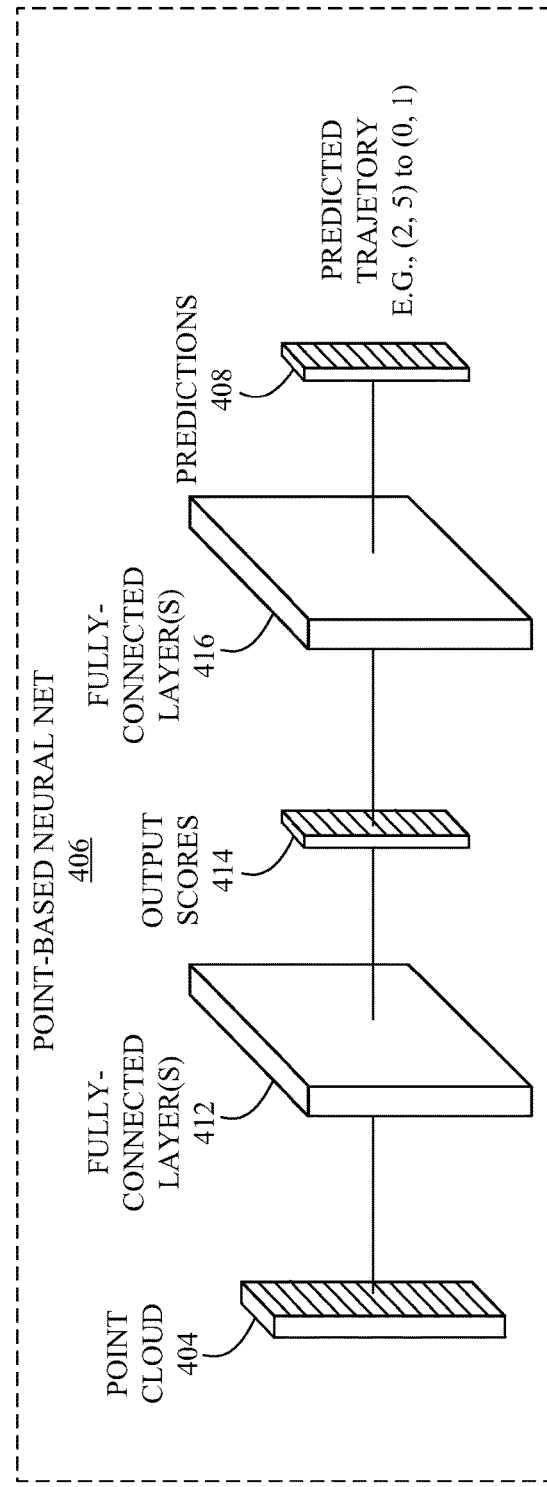
FIG. 4B illustrates an example point-based neural network.

FIG. 4B illustrates an example point-based neural network (PBNN) 406. The PBNN 406 includes at least one fully-connected layer, which may receive the point cloud 404 as input and generate predictions 410. In the example of FIG. 4B, the PBNN 406 includes one or more first fully-connected layers 412, which may receive the point cloud 404 as input and generate output scores 414 for the point cloud 404, and one or more second fully-connected layers 416, which may receive the output scores 414 as input and generate the predictions 410. The predictions 410 may include one or more predicted trajectories. Each predicted trajectory may include a list of one or more trajectory points through which the trajectory passes. For example, the trajectory (2, 5) to (0, 1) passes through the points (2, 5) and (0, 1). The points of the trajectory may be relative to axes in a top-down view of the vehicle's environment.

Figure 4C:
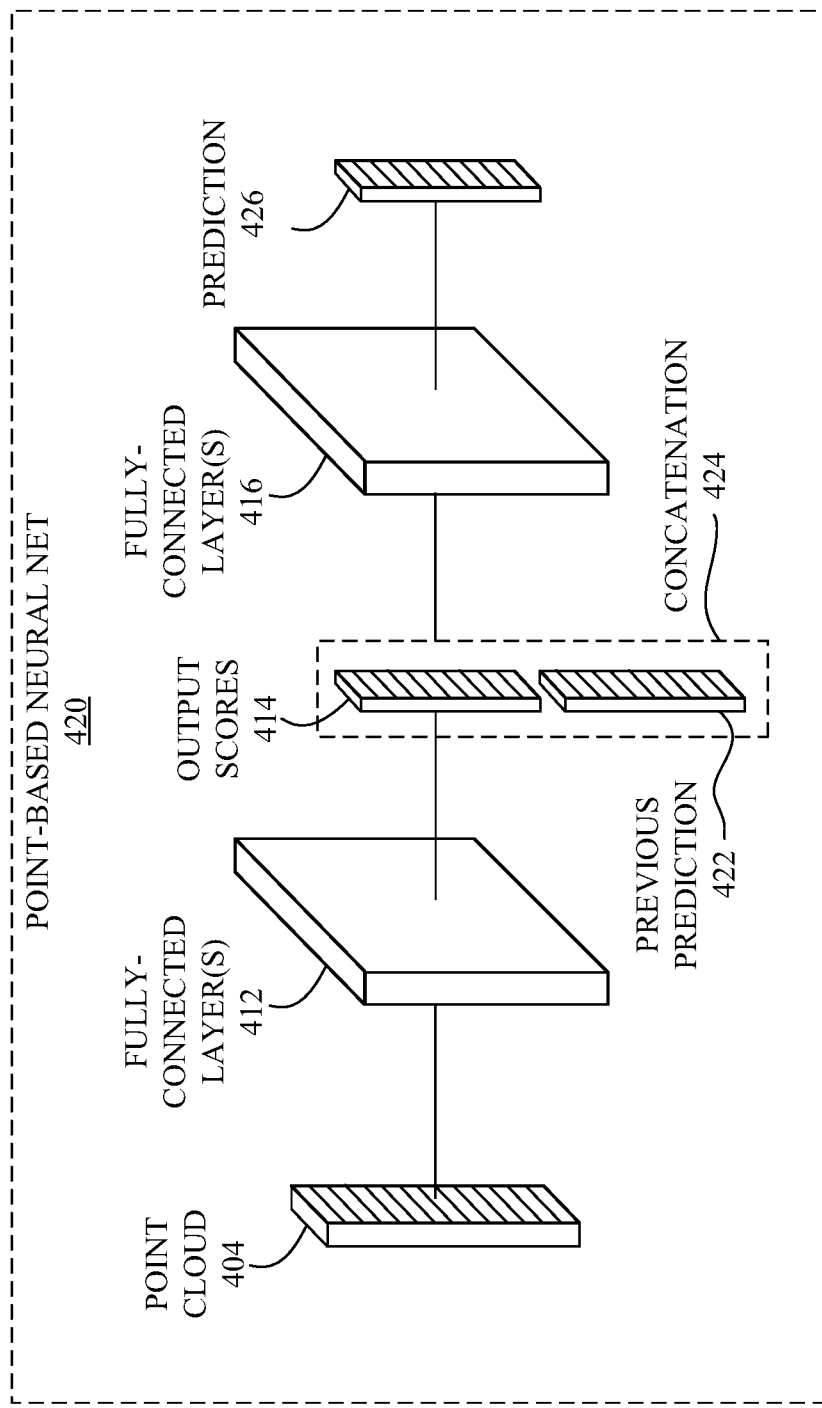
FIG. 4C illustrates an example point-based neural network that includes a previous prediction input to represent object velocity.

FIG. 4C illustrates an example point-based neural network 420 that includes a previous prediction input 422 to represent object velocity. Each predicted trajectory may be represented as a list of points as described above. Velocity may be represented by feeding a previous prediction 422 (e.g., a prediction 422 generated by the neural network 420 at a previous time) to the neural network 420 as an additional input. For example, the output scores 414 produced by the first fully-connected layers 412 may be combined with the previous prediction 422 via a concatenation operation 424, and the result of the concatenation operation 424 may be provided to the second fully-connected layers 416 as input. The second fully-connected layers 416 may then infer the predicted trajectories based on the previous trajectory and the features of the point cloud 404 that correspond to the time when the prediction 426 is being generated. For example, if the previous prediction includes a trajectory point (−1, 0), and the current prediction 426 includes a trajectory point (0, 0), then the difference between the trajectories indicates a speed of approximately 1 meter per second, which may be inferred by the neural network 420 and used to generate the prediction 426.

Thus, the speed or velocity of an object may be represented in the PBNN 420 based on points that correspond to previous locations of objects (e.g., at times in the past). The PBNN 420 may then infer the velocity of objects from the changes in location over time represented by changes in coordinate values. Further, a speed or velocity value may be associated with each point in the point cloud 404 as a feature. The speed or velocity feature values may be determined by the feature transform 402 based on speed or velocity values in the obstacle messages 204, and/or may be determined or updated based on changes in object coordinates over time. For example, a point cloud 404 may include a first set of points that represent an object in the environment at a time $T_0$ in the past and a second plurality of points that represent the object at a time $T_1$ in the past. Using the point cloud 404 containing the two sets of points as input, the PBNN 420 may generate a prediction 426 for the object is based on a speed of the object, since the speed of the object is encoded in the two points. The PBNN 420 may determine the speed based on a distance between at least one of the first set of points and a corresponding at least one of the second plurality of points.

Figure 4D:
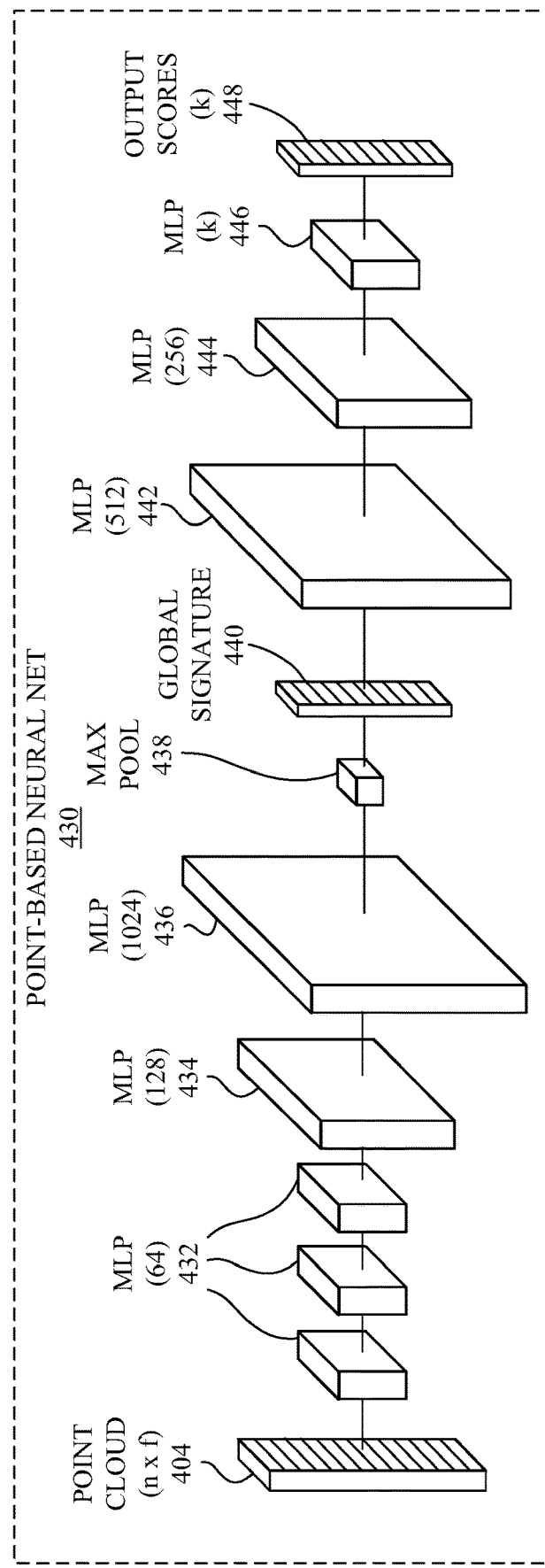
FIG. 4D illustrates an example PointNet point-based neural network.

FIG. 4D illustrates an example PointNet point-based neural network 430. The point-based neural net 430 receives a point cloud 404 as input. The point cloud 404 may include n points off features each. Three successive multi-level perceptron (MLP) layers 432, each of size 64×64 (e.g., a 64×64 matrix of values) process the point cloud 404. The third MLP (64×64) layer 432 provides its output to a MLP (128×128) layer 434, which in turn provides its output to a MLP (1024×1024) layer 436. The output of the MLP (1024×1024) layer 436 is reduced to a global signature 440 by a max pool layer 438. The global signature 440 is then provided as input to a succession of MLPs, which include a MLP (512) 442, a MLP (256) 444, and a MLP (k) 446. The MLP 446 produces k output scores 448, which may be used as a prediction.

Figure 5:
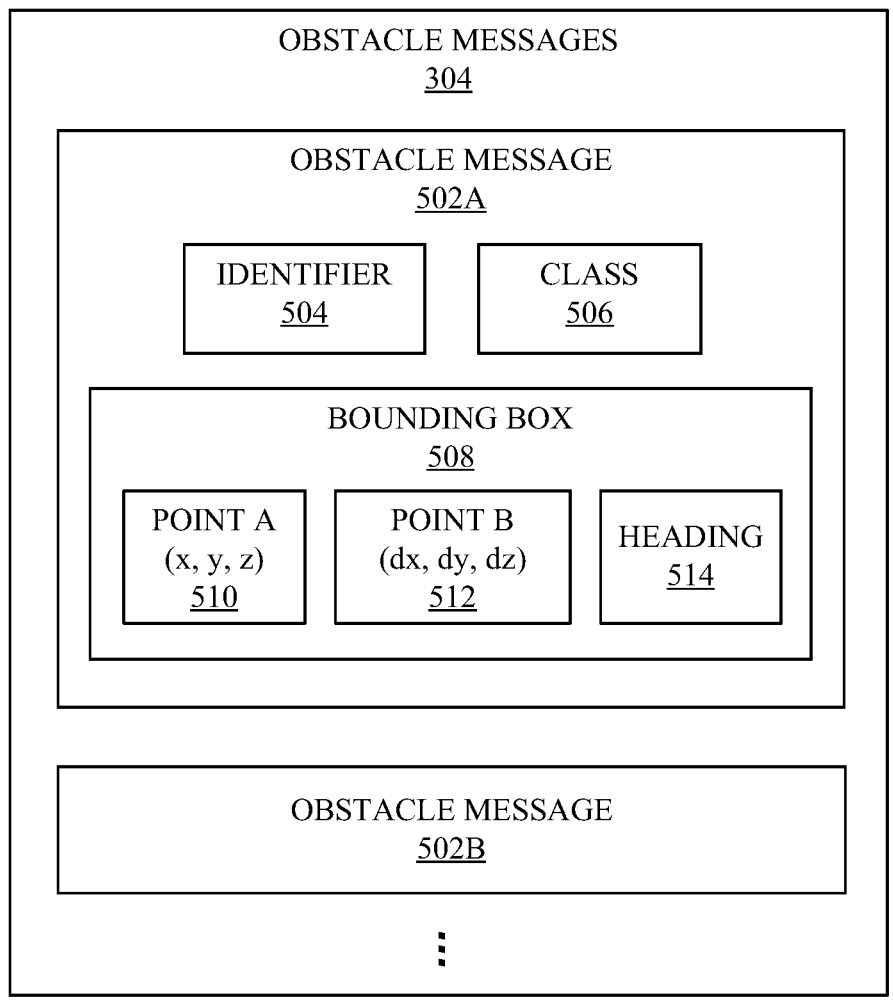
FIG. 5 illustrates an example obstacle message.

FIG. 5 illustrates example obstacle messages 204. The obstacle messages 204 include a first obstacle message 502a and a second obstacle message 502b. The first obstacle message 502a includes an identifier 504 and a class 506. The class 506 may be a classification of the object represented by the obstacle message 502a, e.g., as a car, pedestrian, or other type of object. The obstacle message 502a also includes a bounding box specification 508, which may be specified by two points, including a point A 510 and a point B 512. For example, the two points may be opposite corners of the bounding box. The obstacle message 502a may also include a heading 514. The second obstacle message 502b may be similar to the first obstacle message 502a, and the contents of the second obstacle message 502b are not shown. The obstacle messages 204 may include any number of additional obstacle messages 502.

Figure 6:
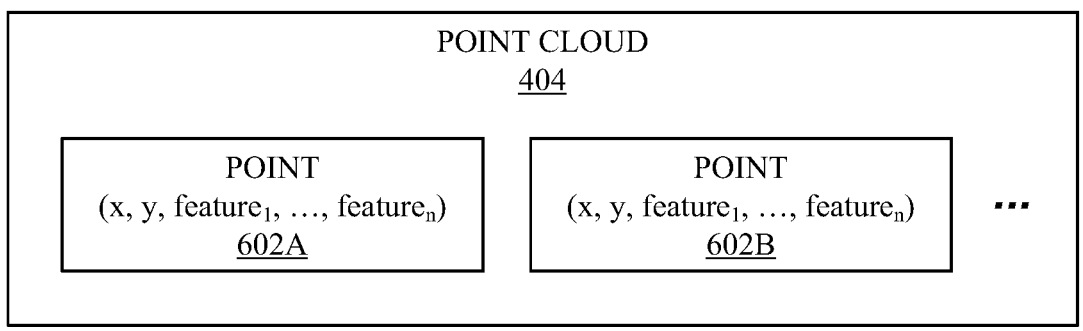
FIG. 6 illustrates an example point cloud.

FIG. 6 illustrates an example point cloud 404. The point cloud 404 includes any number of points 602, of which two, 602a and 602b, are shown. Point 602a includes x, y coordinates and n feature values. Point 602b includes x, y coordinates and n feature values, which may be different from those of point 602a. Different points may include different numbers of feature values. For example, one or more of the feature values may be optional. One or more of the points 602 may include additional coordinates, e.g., a z coordinate. The feature values may be, e.g., numbers, strings, or other types of data. The feature values are not necessarily stored in the point cloud, but may be stored and retrieved based on the associated point, e.g., using the associated point as a lookup key. The point cloud 404 may be stored in a memory 1404 and/or a storage 1406 of a computer system 1400, such as that shown in FIG. 14, or the vehicle system 100 shown in FIG. 1. Timestamps may be associated with the points so that points older than a threshold age may be deleted from the point cloud 404.

FIG. 7 illustrates an example vehicle environment 700. The vehicle environment 700 corresponds to a three-dimensional physical environment that includes a street intersection, street lanes, traffic lights, cars, a pedestrian, and buildings. These objects may be referred to as "obstacles" herein. The vehicle environment 700 may be depicted in a camera image captured by one or more cameras of a vehicle that is not shown. The vehicle environment 700 includes an oncoming car 702, a car ahead 704, a car farther ahead 710, a pedestrian 714, a light post 716, a turning car 718, a left lane marker 706, and a right lane marker 708. Bounding boxes are shown as rectangles having dashed lines superimposed on the vehicle environment 700 for illustrative purposes. An oncoming car box 703 corresponds to the oncoming car 702, a box ahead 705 corresponds to the car ahead 704, a box farther ahead 711 corresponds to the car farther ahead 710, a pedestrian box 715 corresponds to the pedestrian 714, and a turning box 719 corresponds to the turning car 718. The bounding boxes shown in the vehicle environment 700 are examples, and bounding boxes may be generated for other objects in the vehicle environment 700. Each bounding box may be represented by a set of coordinates, e.g., four corner points of each rectangular bounding box. The vehicle environment 700 is labeled TIME=$T_0$ to indicate that it corresponds to, e.g., occurs at, a time $T_0$.

FIG. 8 illustrates an example image 800 depicting a vehicle environment 700. The image 800 depicts a top view, which may also be referred to as a bird's eye view, of the example vehicle environment 700. The top view may be a two-dimensional view of the objects in the environment 700. The image 800 may correspond to one or more of the images 214 of FIG. 2. For example, the image 800 may be generated by the rasterizer 210 of FIG. 2, and may be provided as input to the convolutional neural net 216. The objects in the image 800, such as the cars 802, 804, 810, 818 and the pedestrian 814, are represented as polygons, e.g., rectangles, that correspond to the bounding boxes of the vehicle environment 700. The image 800 depicts an oncoming car 802 (corresponding to the oncoming car 702), a car ahead 804 (corresponding to the car ahead 704), a car farther ahead 810 (corresponding to the car farther ahead 710), a pedestrian 814 (corresponding to the pedestrian 714), and a turning car 818 (corresponding to the turning car 718). The image 800 also depicts a left lane marker 806 (corresponding to the left lane marker 706) and a right lane marker 808 (corresponding to the right lane 708). In the image 800, the upward direction is north, as shown by the arrow.

Figures 9A, 9B:
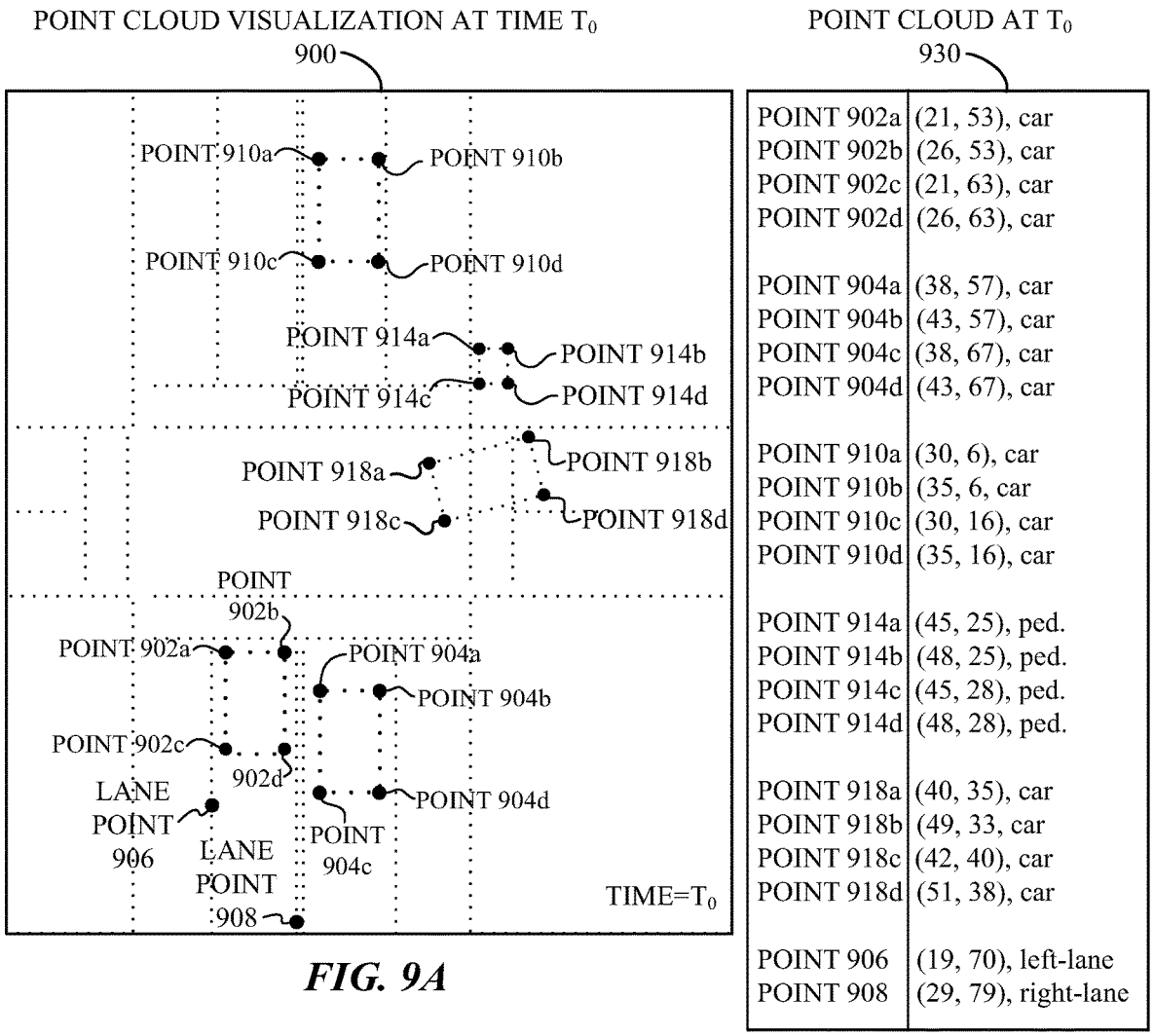
FIG. 9A illustrates an example visualization of a point cloud representing a vehicle environment at an initial time.
FIG. 9B illustrates an example point cloud representing a vehicle environment at an initial time.

FIG. 9A illustrates an example visualization 900 of a point cloud 930 representing a vehicle environment at an initial time $T_0$. The point-cloud visualization 900 shows points of a point cloud that represent the obstacles of the vehicle environment 700. The point-cloud visualization at 900 is shown for illustrative purposes and need not be generated or rendered. The points of the point cloud shown in the visualization 900 may be generated based on bounding boxes of corresponding objects shown in FIG. 7, e.g., by the perspective transform 206 and the feature transform 402. The points are described below as representing the objects (instead of the bounding boxes) for simplicity of explanation. The point-cloud visualization 900 includes four points for each obstacle, and several points for each lane boundary. The oncoming car 702 is represented by points 902a, 902b, 902c, 902d. The car ahead 704 is represented by points 904a, 904b, 904c, 904d. The left lane marker 706 is represented by left lane point 906 (and other points along the left lane marker, which are not labeled). The right lane marker 708 is represented by right lane point 908 (and other points along the right lane marker, which are not labeled). The car farther ahead 710 is represented by points 910a, 910b, 910c, 910d. The pedestrian 714 is represented by the points 914a, 914b, 914c, 914d. The turning car 718 is represented by the points 918a, 918b, 918c, 918d. The coordinates and feature value(s) of these points are shown FIG. 9B, as described below.

Although additional points are shown between the corner points (e.g., the points between points 902a and 902c), these additional points are optional. The number of additional points between the corner points may be determined based on factors such as the desired resolution and the amount of available storage and processing capacity. For example, 5 additional points are shown between points 902a and 902c. These additional points may improve the accuracy of predictions generated based on the point cloud shown in the visualization 900 but may also increase the storage and processing overhead needed for the point cloud and for generating predictions based on the point cloud. Further, although four corner points are shown for each object, e.g., points 902a, 902b, 902c, 902d for oncoming car 702, more or fewer corner points may be included in the point cloud. For example, one, two, or three corner points may be included instead of the four shown. As another example, additional points may be included in the representation of an object, e.g., to represent objects that are not rectangular in shape (e.g., pedestrians), or to more accurately represent the shape of objects.

FIG. 9B illustrates an example point cloud 930 representing a vehicle environment at an initial time $T_0$. The point cloud 930 includes a list of the points that are shown in the point-cloud visualization 900. Each point in the point cloud 930 includes (x, y) coordinate values and a class, e.g., car, pedestrian, left lane, or right lane. The class value of each point may be included in or associated with a data structure representing each point. The points are grouped by the objects they represent. The first four points, 902a-d, represent the oncoming car 702. The first four points 902a-d and their associated classes are "(21, 53), car" for point 902a, "(26, 53), car" for point 902b, "(21, 63), car" for point 902c, and "(26, 63), car" for point 902d. These specific x and y values specify the locations of the corresponding points, which are shown in the point-cloud visualization 900. Further, the four points 904a-d represent the car ahead 704. The four points 910a-d represent the car farther ahead 710. The four points 914a-d represent the pedestrian 714. The four points 918a-d represent the turning car 718. Point 906 represents the left lane marker 706, and point 908 represents the right lane marker 708. Although a particular number of points are shown for each type of object (e.g., four points for each car), any suitable number of points may be used to represent each object. The left column of FIG. 9B, which identifies each point with a label such as "POINT 902a", is shown for illustrative purposes, and is not necessarily included in the point cloud 930. The left column may represent memory addresses or identifiers associated with the points in the point cloud, for example.

FIG. 9C illustrates an example visualization 940 of a point cloud 950 at a first subsequent time $T_1$. The objects in the example environment have moved since time $T_0$. For example, the oncoming car 702 has moved to the south, the turning car 718 has moved to the southwest, and the pedestrian 714 has moved to the west. Sensors on the vehicle, such as a camera, have detected the movement of these objects. With reference to FIG. 4A, the sensor data transform 202 has received updated sensor data 160 that represents the new locations of the objects as of time $T_1$, and new obstacle messages 204 that include the new locations of the objects have been generated. The new obstacle messages 204 have been provided to the perspective transform 206, which has transformed them to new points 408. The new points 408 have been added to the point cloud 404, e.g., by the feature transform 402.

As shown in the visualization 940, the new points 922a-d, 928a-d, and 924a-d correspond to the new locations of the oncoming car 702, turning car 718, and pedestrian 714, respectively. The points 922a-d representing the oncoming car 702 have moved to the south, the points 928a-d representing the turning car 718 have moved to the southwest, and the points 924a-d representing the pedestrian 714 have moved to the west.

FIG. 9D illustrates an example point cloud 950 at a first subsequent time $T_1$. The point cloud 950 for time interval $T_0$ to $T_1$ includes the new points 922a-d, 924a-d, and 928a-d as well as the older points 902a-d, 914a-d, and 918a-d that represent the previous locations of the respective objects. Points may be retained in the point cloud for a period of time. Points that represent past locations of objects may be used by the point-based neural net 406 to infer the speed of the objects, e.g., as described with reference to FIG. 4C. In particular embodiments, points older than a threshold age, e.g., 5 minutes, 30 minutes, 1 hour, or 1 day, may be deleted from the point cloud 950, to bound the amount of storage used by the point cloud. Alternatively or additionally, the size of the point cloud 950 may be bounded by deleting the oldest points until there are fewer than a threshold number of points, or the size of the point cloud is less than a threshold number of bytes. Any other suitable technique may be used to bound the size of the point cloud 950.

Figure 9E:
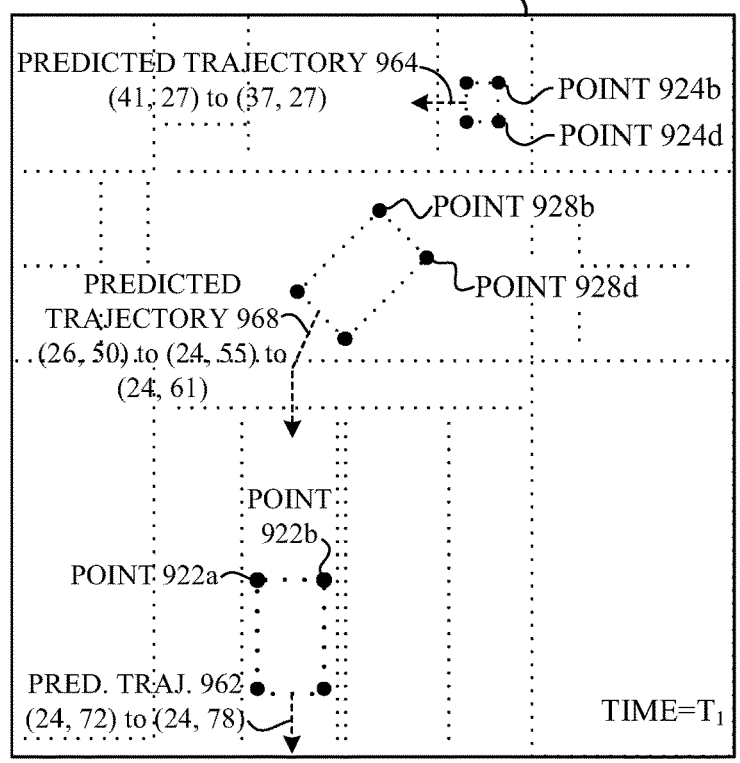
FIG. 9E illustrates example visualization of predicted trajectories at a first subsequent time.

FIG. 9E illustrates an example visualization 960 of predicted trajectories at a first subsequent time $T_1$. FIG. 9E is similar to FIG. 9D, but also includes visualizations of three example predicted trajectories 962, 964, 968, which represent paths to which or through which the corresponding objects are predicted to move. The predicted trajectories are shown as dashed lines with arrows pointing in the direction of expected movement. The example predicted trajectories may be generated by the point-based neural net 406 based on its training (e.g., weight values of its layers) and the point cloud 404 (e.g., the point cloud 950 shown in FIG. 9D). The example predicted trajectories 962, 964, 968 are for the oncoming car 702, the pedestrian 714, and the turning car 718, respectively. The example predicted trajectories 962, 964, 968 may have been generated by the point-based prediction system 400 based on the point cloud 950 (which is also shown in graphical form in the visualization 940).

In particular embodiments, each predicted trajectory may include an ordered list of one or more points to which or through which the corresponding object is expected to move. For example, the predicted trajectory 962 includes the points (24, 72) and (24, 78) to specify that the object corresponding to the points 922a-d (the oncoming car 702) is expected to move to point (24, 72) and then to point (24, 78) after the predicted trajectory 962 is generated. As another example, the predicted trajectory 964 includes the points (41, 27) and (37, 27) to specify that the object corresponding to the points 924a-d (the pedestrian 714) is expected to move to point (41, 27) and then to point (37, 27). As an example of a three-point trajectory, the predicted trajectory 968 includes the points (26, 50), (24, 55), and (24, 61) to specify that the object corresponding to the points 928a-d (the turning car 718) is expected to move to point (26, 50), then to point (24, 55), and then to point (24, 61). As another example (not shown), a predicted trajectory may include one point, e.g., the point (24, 72), to indicate that the associated object is predicted to move from its present position to the location that corresponds to the point (24, 72). The coordinate values may be in any suitable units, which may be converted to other units as needed. For example, the coordinates (24, 72) may be converted to a latitude and longitude. As another alternative, the coordinates may be in suitable units, e.g., (latitude, longitude) pairs.

In particular embodiments, the point-based neural net 406 may perform an inference for each object (e.g., obstacle), and generate a prediction 410, such as a trajectory for the object. The input (point cloud 404) to the point-based neural net 406 may be a representation of an area around (e.g., containing or surrounding) the obstacle, and the output prediction 410 may be a set of points (or other control output representation) that represent the predicted trajectory of the object.

Alternatively or additionally, in particular embodiments, the point-based neural net 406 may perform inferences for multiple objects jointly in a single pass, with the input (e.g., point cloud 404) including a representation of multiple objects in an area around the ego vehicle. The input may correspond to one or more time slices, and the output may be a prediction 410, such as a set of points, that represents predicted trajectories of the multiple objects. Each object may be associated with an object identification such as a numeric value (e.g., 101 for a first object, 102 for a second object, and so on). For each prediction 410, the point-based prediction system 400 may provide an identification of the corresponding object to which the prediction 410 applies. Other system components, such as the planning module 120, may then use this corresponding object identification to identify the object to which each prediction 410 applies. The point-based prediction system 400 may associate an object identifier, such as the obstacle identifier 504, with each point in the point cloud, e.g., as a feature of the point. The point-based prediction system 400 may provide the associated object identifier for each prediction 410, e.g., as a value associated with each prediction 400, or associated with each point in each predicted trajectory. The object to which a particular trajectory corresponds may then be identified based on the object identifier associated with the trajectory. The object identifier may be a value, such as a number or name, that identifies the particular object to which the point corresponds. For example, point 928a may be associated with an identifier for the turning car 718, such as "18" or "Car-18", to indicate that the point corresponds to the turning car 718. The object identifier may be stored in a feature value associated with the point 928a or otherwise associated with the point 928a. The value of the object identifier may be based on an obstacle identifier received in an obstacle message 204, for example.

In particular embodiments, to make the object identifier that corresponds to each prediction 410 available with the prediction 410, the point-based prediction system 400 may maintain an association between the points on which each prediction 410 is based and the prediction 410 itself. For example, the point-based prediction system 400 may pass the object identifier associated with each point (e.g., the object identifier feature value) through the point-based neural net 406, so that each prediction 410 is associated with the object identifier feature value of the points to which the prediction corresponds. Since the points of each predicted trajectory may be points from the point cloud 404 (or copies of points from the point cloud 404), each point of the predicted trajectory may have an associated object identifier identifying the object that corresponds to the predicted trajectory.

Figure 9F:
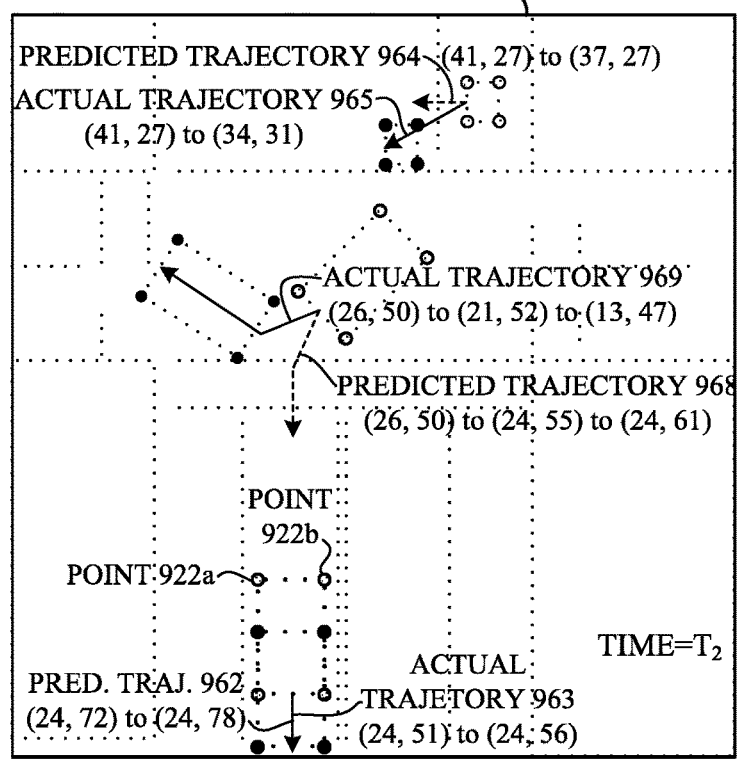
FIG. 9F illustrates example visualization of actual trajectories at a second subsequent time.

FIG. 9F illustrates an example visualization 970 of actual trajectories at a second subsequent time $T_2$. The actual trajectories 963, 969, 965 may be the trajectories actually taken by the corresponding objects (the oncoming car 702, turning car 718, and pedestrian 714, respectively). The actual trajectories may be used for training the point-based neural net 406, as described below. The actual trajectories may be identified by the point-based prediction system 400 based on the locations of detected points that correspond to the objects at a time after the predicted trajectories were generated by the point-based neural net 406, e.g., after the corresponding objects moved to or through the actual trajectories. The visualization 970 is for a time $T_2$, which is after the objects represented in the visualization have moved through the illustrated actual trajectories. For example, the actual trajectories may be retrieved from a log of sensor data 160 and/or point cloud 404 points. The retrieval may be performed at time $T_2$ or later.

In particular embodiments, if sensor data 160 is retrieved from a log, the corresponding point cloud 404 points may be determined by transforming the sensor data 160 to points using the transforms of the point-based prediction system 400. The data items or points in the log may be time stamped to enable identification of the actual trajectories that correspond to a predicted trajectory. The actual trajectories may be identified by, e.g., by retrieving the data items associated with a particular object and a range of time that begins at or within a threshold time after a predicted trajectory was generated.

In particular embodiments, the point-based neural network 406 may be trained using an objective function or solver to optimize the neural network's weights for correct predictions. The correct predictions may be the actual trajectories. A loss may be computed based on how far off the predicted trajectories are from the corresponding actual trajectories. The loss may be computed using a loss function such as mean-squared error or the like. If a previously-predicted operation that was to occur during a particular time period is different from an actual operation that actually occurred during the particular time period, then the training of the machine-learning model may be updated with an indication that the actual operations are correct for the point cloud data on which the incorrect prediction was based. For example, the loss that represents the difference between the predicted trajectory that was predicted to be followed by an object during particular time period and the corresponding actual trajectory that the object actually moved to or through during the particular time period may be used to train the point-based neural net 406 for each pair of predicted and actual trajectories in the log of historical data.

Referring to FIG. 9F, the actual trajectory 963 of the oncoming car 702 is the same as the predicted trajectory 962, so the training of the point-based neural net 406 need not be updated for the actual trajectory 963 and predicted trajectory 962. The actual trajectory 969 of the turning car 718 is different from the predicted trajectory 968, however, so the loss may be computed and used to update the point-based neural net 406. The loss for the turning car prediction may be computed using a mean-squared error function on the actual trajectory 969, which includes the points (26, 50), (21, 52), and (13, 47), and the predicted trajectory 968, which includes the points (26, 50), (24, 55), and (24, 61).

As another example, the actual trajectory 965 of the pedestrian 714 is different from the predicted trajectory 964, so the loss may be computed and used to update the point-based neural net 406. The loss for the pedestrian prediction may be computed using the mean-squared error function on the actual trajectory 965, which includes the points (41, 27) and (34, 31), and the predicted trajectory 964, which includes the points (41, 27) and (37, 27).

Figure 10:
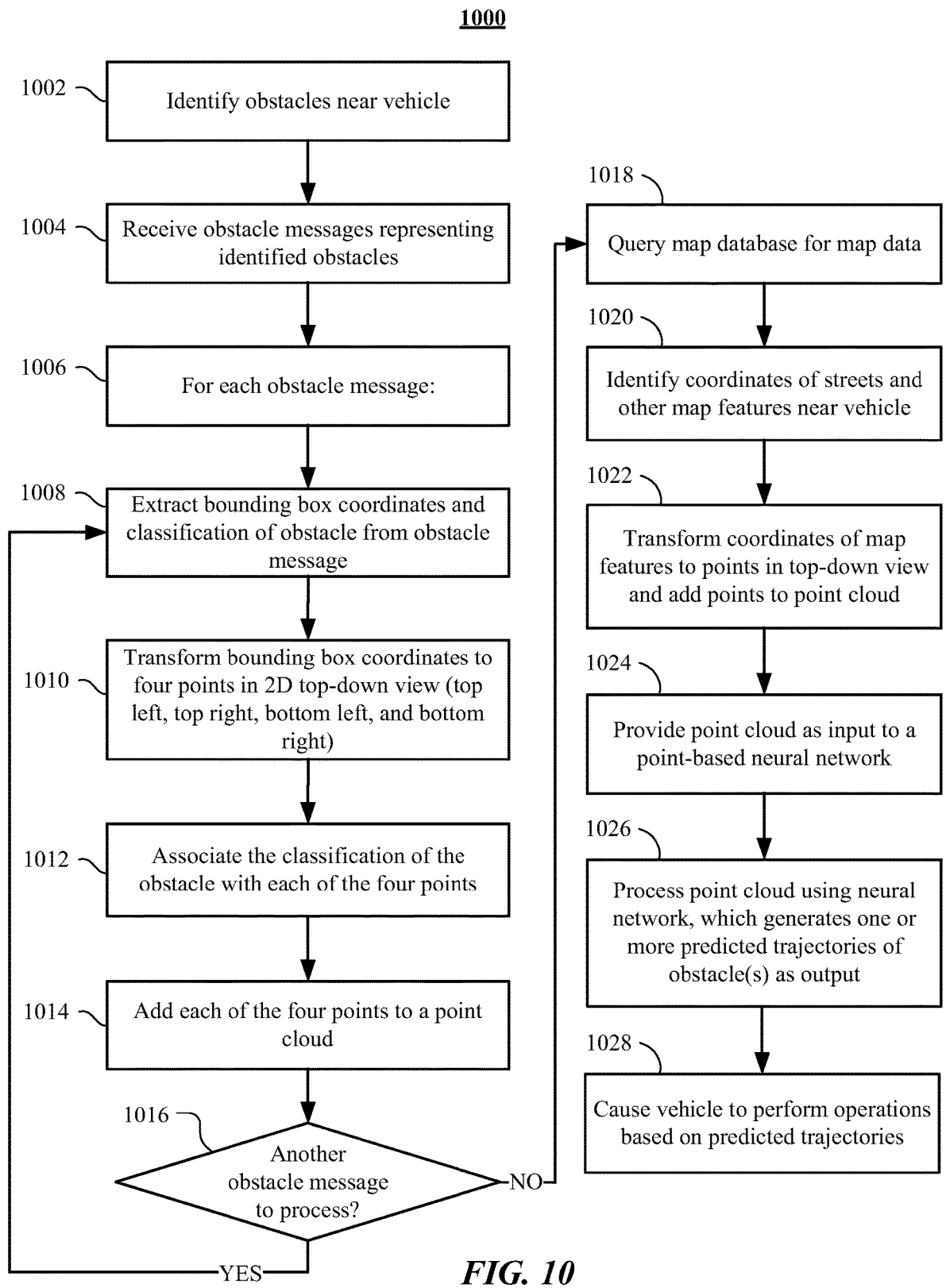
FIG. 10 illustrates an example of a method for predicting trajectories of objects using a neural network that processes a point-based representation of a vehicle environment.

FIG. 10 illustrates an example method 1000 for predicting trajectories of objects using a neural network that processes a point-based representation of a vehicle environment. The method may begin at step 1002, where a point-based prediction system 400 may query a perception system to identify obstacles near the vehicle. Obstacles near the vehicle may be, e.g., obstacles within a threshold distance of the vehicle. The threshold distance may be a suitable number such as 10 feet, 25 feed, 50 feed, 100 feet, 500 feet, or the like. The obstacles may be other vehicles, pedestrians, animals, bicycles, signs, street lights, lamp posts, trees, buildings, and so on. In particular embodiments, the obstacles may be objects that are moving or have moved more recently than a threshold time in the past. At step 1004, the prediction system 400 may receive obstacle messages representing the identified obstacles.

At step 1006, the prediction system 400 may begin a loop that repeats steps 1008 through 1016 for each received obstacle message. At step 1008, the prediction system 400 may extract bounding box coordinates and a classification of an obstacle from the obstacle message. At step 1010, the prediction system 400 may transform the bounding box coordinates to four points in 2D top-down view. The points may be identified as the top left, top right, bottom left, and bottom right points. Although these four points are described in this example, the bounding box coordinates may be transformed to any suitable set of one or more points. At step 1012, the prediction system 400 may associate the classification of the obstacle with each of the four points. At step 1014, the prediction system 400 may add each of the points (e.g., the four points) to a point cloud. For example, the points may be added to a list of points that represents the point cloud. The classification and any other features associated with the points may be accessible via the point cloud.

At step 1016, the prediction system 400 may determine whether there is another obstacle message to process. If so, execution may continue at step 1008. If not, execution may continue at step 1018. At step 1018, the prediction system 400 may query a map database for map data. At step 1020, the prediction system 400 may identify coordinates of streets and other map features near the vehicle. Map features near the vehicle may be, e.g., map features within a threshold distance of the vehicle. The threshold distance may be a suitable number such as 10 feet, 25 feet, 50 feet, 100 feet, 500 feet, or the like. At step 1022, the prediction system 400 may transform coordinates of the map features to points in top-down view and add the points to the point cloud. At step 1024, the prediction system 400 may provide the point cloud as input to a point-based neural network. At step 1026, the prediction system 400 may process the point cloud using the point-based neural network. The neural network may generate one or more predicted trajectories of the obstacle(s) as output. At step 1028, the prediction system 400 may cause vehicle to perform operations based on predicted trajectories. For example, the vehicle may be controlled to move in accordance with the predicted trajectories (e.g., by avoiding the locations of the predicted trajectories, such as during times during which the predicted trajectories are predicted to be followed by the objects). As another example, step 1028 may cause the vehicle to provide feedback to a human driver if an object's path diverges from the predicted trajectories or is predicted to diverge from the predicted trajectories, or to display information about the predicted trajectories, display the predicted trajectories on a map, warn the human driver of the vehicle if one or more of the predicted trajectories are predicted to result in a collision, or to perform other suitable operations.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for predicting trajectories of objects including the particular steps of the method of FIG. 10, this disclosure contemplates any suitable method for predicting trajectories of objects including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
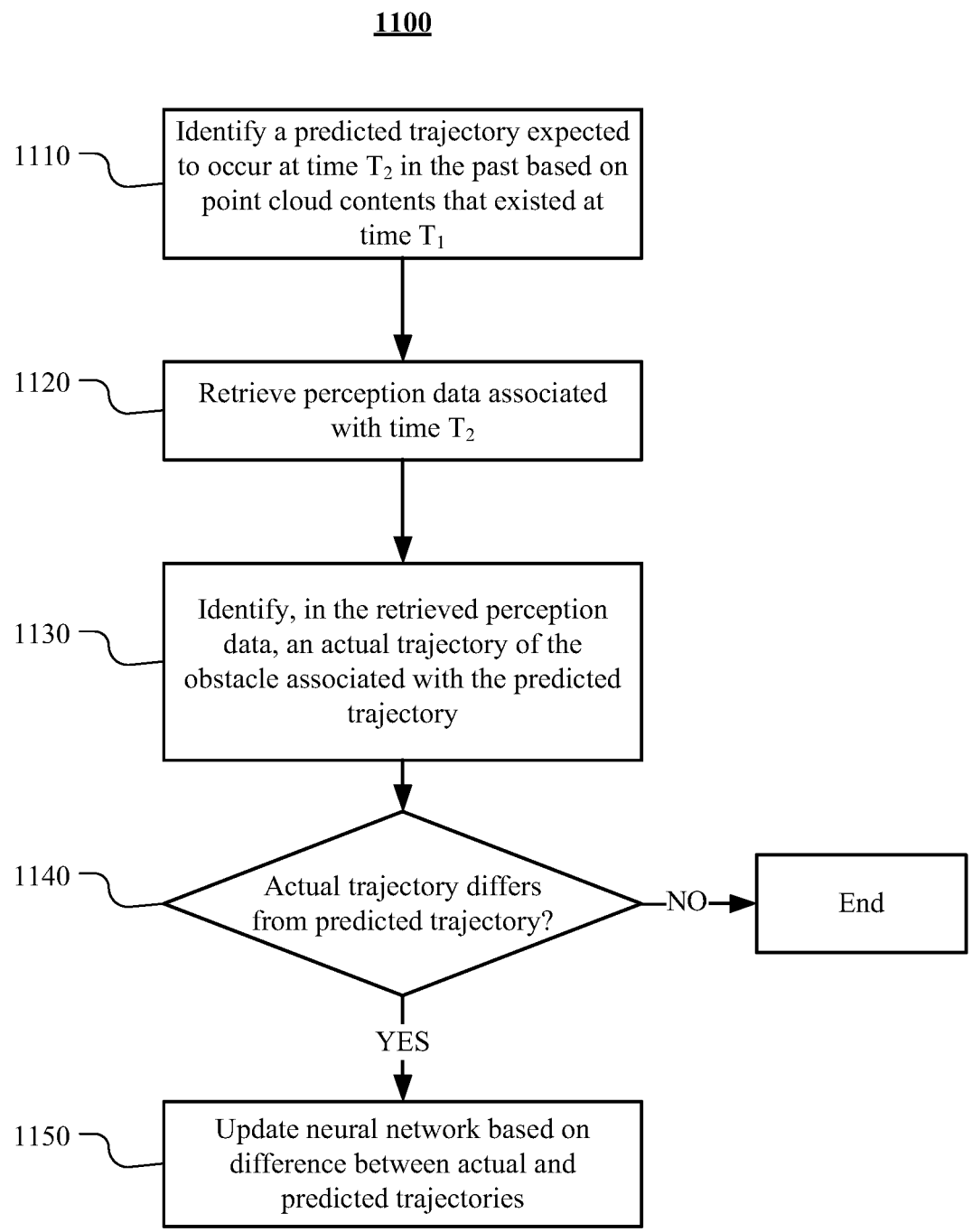
FIG. 11 illustrates an example of a method for training a neural network to predict trajectories of objects by processing a point-based representation of a vehicle environment.

FIG. 11 illustrates an example method 1100 for training a neural network to predict trajectories of objects by processing a point-based representation of a vehicle environment. The method may begin at step 1110, where a point-based prediction system 400 may identify a predicted trajectory expected to occur at a time $T_2$ in the past based on point cloud contents that existed at a time $T_1$ in the past. At step 1120, the point-based prediction system 400 may retrieve perception data associated with time $T_2$. At step 1130, the point-based prediction system 400 may identify, in the retrieved perception data, an actual trajectory of the obstacle associated with the predicted trajectory. At step 1140, the point-based prediction system 400 may determine whether the actual trajectory differs from the predicted trajectory. If so, at step 1150, the point-based prediction system 400 may update the neural network by, for example, updating network weights based on one or more differences between the actual and predicted trajectories. Otherwise, if step 1150 determines that the actual trajectory does not differ from the predicted trajectory, then the method may end without updating the neural network.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for training a neural network including the particular steps of the method of FIG. 11, this disclosure contemplates any suitable method for training a neural network including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
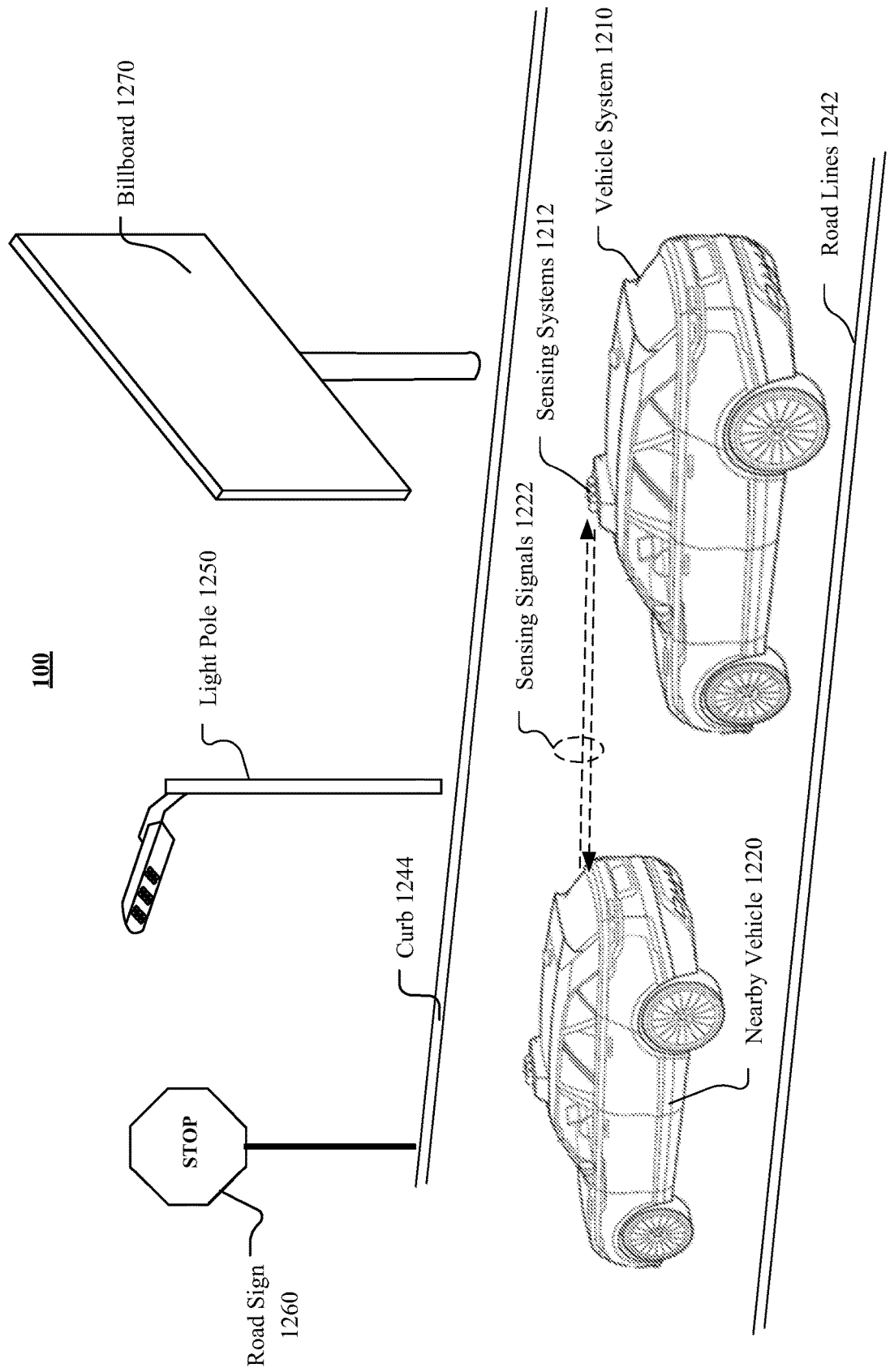
FIG. 12 illustrates an example situation for a data-gathering vehicle system to collect vehicle data of a nearby vehicle and contextual data of the surrounding environment.

FIG. 12 illustrates an example situation 1200 for a data-gathering vehicle system 1210 to collect vehicle data of a nearby vehicle 1220 and contextual data of the surrounding environment. In particular embodiments, the vehicle system 1210 (e.g., autonomous vehicles, manually-driven vehicles, computer-assisted-driven vehicles, human-machine hybrid-driven vehicles, etc.) may have a number of sensors or sensing systems 1212 for monitoring the vehicle status, other vehicles and the surrounding environment. The sensors or sensing systems 1212 may include, for example, but are not limited to, cameras (e.g., optical camera, thermal cameras), LiDARs, radars, speed sensors, steering angle sensors, braking pressure sensors, a GPS, inertial measurement units (IMUs), acceleration sensors, etc. The vehicle system 1210 may include one or more computing systems (e.g., a data collection device, a mobile phone, a tablet, a mobile computer, an on-board computer, a high-performance computer) to collect data about the vehicle, the nearby vehicles, the surrounding environment, etc. In particular embodiments, the vehicle system 1210 may collect data of the vehicle itself related to, for example, but not limited to, vehicle speeds, moving directions, wheel directions, steering angles, steering force on the steering wheel, pressure of braking pedal, pressure of acceleration pedal, acceleration (e.g., based on IMU outputs), rotation rates (e.g., based on IMU/gyroscope outputs), vehicle moving paths, vehicle trajectories, locations (e.g., GPS coordination), signal status (e.g., on-off states of turning signals, braking signals, emergence signals), human driver eye movement, head movement, etc.

In particular embodiments, the vehicle system 1210 may use one or more sensing signals 1222 of the sensing system 1212 to collect data of the nearby vehicle 1220. For example, the vehicle system 1210 may collect the vehicle data and driving behavior data related to, for example, but not limited to, vehicle images, vehicle speeds, acceleration, vehicle moving paths, vehicle driving trajectories, locations, turning signal status (e.g., on-off state of turning signals), braking signal status, a distance to another vehicle, a relative speed to another vehicle, a distance to a pedestrian, a relative speed to a pedestrian, a distance to a traffic signal, a distance to an intersection, a distance to a road sign, a distance to curb, a relative position to a road line, an object in a field of view of the vehicle, positions of other traffic agents, aggressiveness metrics of other vehicles, etc. In addition, the sensing system 1212 may be used to identify the nearby vehicle 1220, which could be based on an anonymous vehicle identifier based on the license plate number, a QR code, or any other suitable identifier that uniquely identifies the nearby vehicle.

In particular embodiments, the vehicle system 1210 may collect contextual data of the surrounding environment based on one or more sensors associated with the vehicle system 1210. In particular embodiments, the vehicle system 1210 may collect data related to road conditions or one or more objects of the surrounding environment, for example, but not limited to, road layout, pedestrians, other vehicles (e.g., 1220), traffic status (e.g., number of nearby vehicles, number of pedestrians, traffic signals), time of day (e.g., morning rush hours, evening rush hours, non-busy hours), type of traffic (e.g., high speed moving traffic, accident events, slow moving traffic), locations (e.g., GPS coordination), road conditions (e.g., constructing zones, school zones, wet surfaces, ice surfaces), intersections, road signs (e.g., stop sign 1260, road lines 1242, cross walk), nearby objects (e.g., curb 1244, light poles 1250, billboard 1270), buildings, weather conditions (e.g., raining, fog, sunny, hot weather, cold weather), or any objects or agents in the surrounding environment. In particular embodiments, the contextual data of the vehicle may include navigation data of the vehicle, for example, a navigation map, a navigating target place, a route, an estimated time of arriving, a detour, etc. In particular embodiments, the contextual data of the vehicle may include camera-based localization data including, for example, but not limited to, a point cloud, a depth of view, a two-dimensional profile of environment, a three-dimensional profile of environment, stereo images of a scene, a relative position (e.g., a distance, an angle) to an environmental object, a relative position (e.g., a distance, an angle) to road lines, a relative position in the current environment, a traffic status (e.g., high traffic, low traffic), driving trajectories of other vehicles, motions of other traffic agents, speeds of other traffic agents, moving directions of other traffic agents, signal statuses of other vehicles, etc. In particular embodiments, the vehicle system 1210 may have a perception of the surrounding environment based on the contextual data collected through one or more sensors in real-time and/or based on historical contextual data stored in a vehicle model database.

Figure 13:
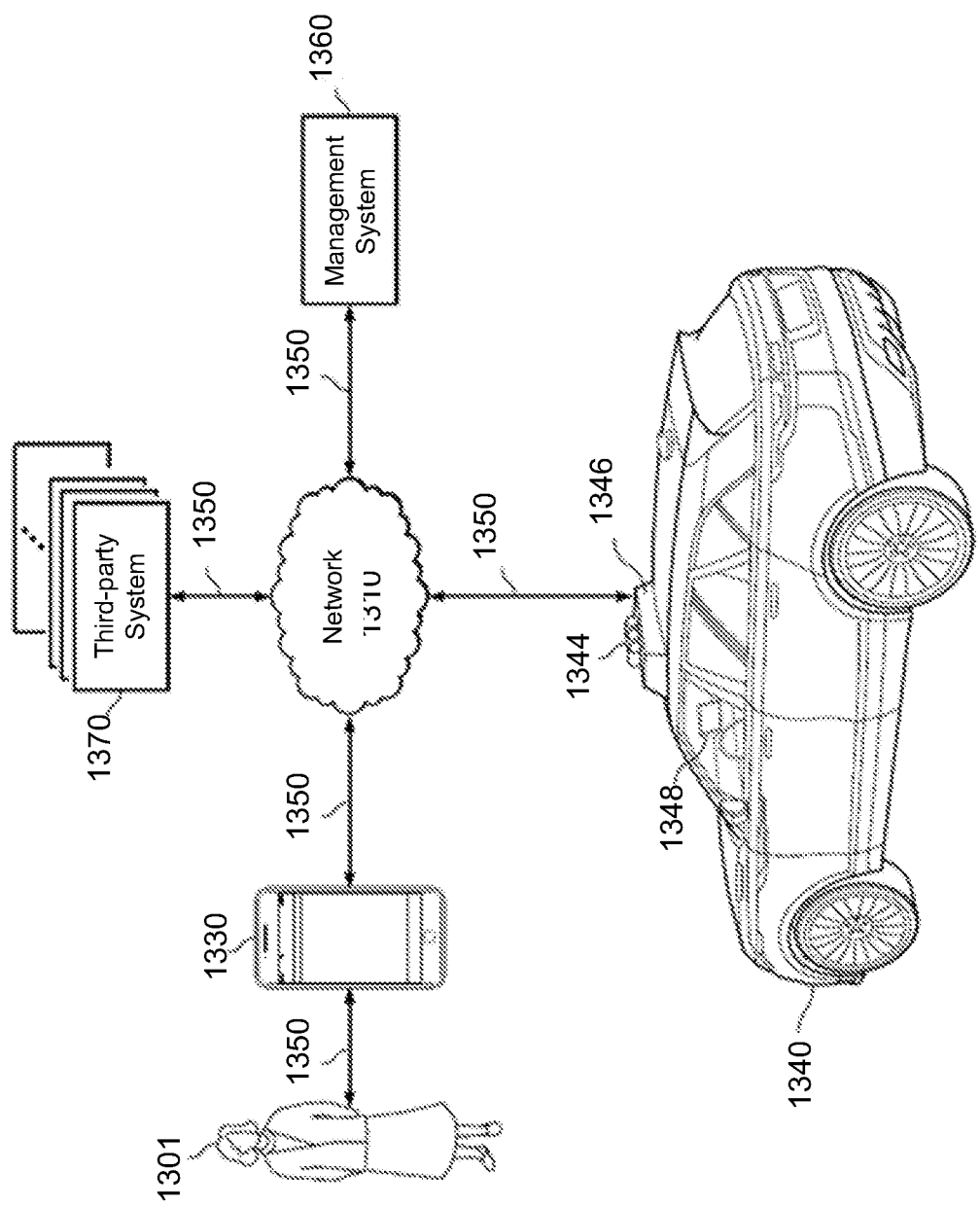
FIG. 13 illustrates an example block diagram of a transportation management environment for matching ride requestors with autonomous vehicles.

FIG. 13 illustrates an example block diagram of a transportation management environment for matching ride requestors with autonomous vehicles. In particular embodiments, the environment may include various computing entities, such as a user computing device 1330 of a user 1301 (e.g., a ride provider or requestor), a transportation management system 1360, an autonomous vehicle 1340, and one or more third-party system 1370. The computing entities may be communicatively connected over any suitable network 1310. As an example and not by way of limitation, one or more portions of network 1310 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 13 illustrates a single user device 1330, a single transportation management system 1360, a single vehicle 1340, a plurality of third-party systems 1370, and a single network 1310, this disclosure contemplates any suitable number of each of these entities. As an example and not by way of limitation, the network environment may include multiple users 1301, user devices 1330, transportation management systems 1360, autonomous-vehicles 1340, third-party systems 1370, and networks 1310.

The user device 1330, transportation management system 1360, autonomous vehicle 1340, and third-party system 1370 may be communicatively connected or co-located with each other in whole or in part. These computing entities may communicate via different transmission technologies and network types. For example, the user device 1330 and the vehicle 1340 may communicate with each other via a cable or short-range wireless communication (e.g., Bluetooth, NFC, WI-FI, etc.), and together they may be connected to the Internet via a cellular network that is accessible to either one of the devices (e.g., the user device 1330 may be a smartphone with LTE connection). The transportation management system 1360 and third-party system 1370, on the other hand, may be connected to the Internet via their respective LAN/WLAN networks and Internet Service Providers (ISP). FIG. 13 illustrates transmission links 1350 that connect user device 1330, autonomous vehicle 1340, transportation management system 1360, and third-party system 1370 to communication network 1310. This disclosure contemplates any suitable transmission links 1350, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 1350 may connect to one or more networks 1310, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 1350. For example, the user device 1330 may communicate with the transportation management system via a cellular network and the Internet, but communicate with the autonomous vehicle 1340 via Bluetooth or a physical wire connection.

In particular embodiments, the transportation management system 1360 may fulfill ride requests for one or more users 1301 by dispatching suitable vehicles. The transportation management system 1360 may receive any number of ride requests from any number of ride requestors 1301. In particular embodiments, a ride request from a ride requestor 1301 may include an identifier that identifies the ride requestor in the system 1360. The transportation management system 1360 may use the identifier to access and store the ride requestor's 1301 information, in accordance with the requestor's 1301 privacy settings. The ride requestor's 1301 information may be stored in one or more data stores (e.g., a relational database system) associated with and accessible to the transportation management system 1360. In particular embodiments, ride requestor information may include profile information about a particular ride requestor 1301. In particular embodiments, the ride requestor 1301 may be associated with one or more categories or types, through which the ride requestor 1301 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 1360 may classify a user 1301 based on known information about the user 1301 (e.g., using machine-learning classifiers), and use the classification to retrieve relevant aggregate information associated with that class. For example, the system 1360 may classify a user 1301 as a young adult and retrieve relevant aggregate information associated with young adults, such as the type of music generally preferred by young adults.

Transportation management system 1360 may also store and access ride information. Ride information may include locations related to the ride, traffic data, route options, optimal pick-up or drop-off locations for the ride, or any other suitable information associated with a ride. As an example and not by way of limitation, when the transportation management system 1360 receives a request to travel from San Francisco International Airport (SFO) to Palo Alto, Calif., the system 1360 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 1360. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 1360. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 1360 in particular embodiments may predict and provide ride suggestions in response to a ride request. In particular embodiments, the system 1360 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 1360 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 1360 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 1330 (which may belong to a ride requestor or provider), a transportation management system 1360, vehicle system 1340, or a third-party system 1370 to process, transform, manage, retrieve, modify, add, or delete the information stored in the data store.

In particular embodiments, transportation management system 1360 may include an authorization server (or any other suitable component(s)) that allows users 1301 to opt-in to or opt-out of having their information and actions logged, recorded, or sensed by transportation management system 1360 or shared with other systems (e.g., third-party systems 1370). In particular embodiments, a user 1301 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1301 of transportation management system 1360 through blocking, data hashing, anonymization, or other suitable techniques as appropriate.

In particular embodiments, third-party system 1370 may be a network-addressable computing system that may provide HD maps or host GPS maps, customer reviews, music or content, weather information, or any other suitable type of information. Third-party system 1370 may generate, store, receive, and send relevant data, such as, for example, map data, customer review data from a customer review website, weather data, or any other suitable type of data. Third-party system 1370 may be accessed by the other computing entities of the network environment either directly or via network 1310. For example, user device 1330 may access the third-party system 1370 via network 1310, or via transportation management system 1360. In the latter case, if credentials are required to access the third-party system 1370, the user 1301 may provide such information to the transportation management system 1360, which may serve as a proxy for accessing content from the third-party system 1370.

In particular embodiments, user device 1330 may be a mobile computing device such as a smartphone, tablet computer, or laptop computer. User device 1330 may include one or more processors (e.g., CPU and/or GPU), memory, and storage. An operating system and applications may be installed on the user device 1330, such as, e.g., a transportation application associated with the transportation management system 1360, applications associated with third-party systems 1370, and applications associated with the operating system. User device 1330 may include functionality for determining its location, direction, or orientation, based on integrated sensors such as GPS, compass, gyroscope, or accelerometer. User device 1330 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 1330 may also include one or more cameras, scanners, touchscreens, microphones, speakers, and any other suitable input-output devices.

In particular embodiments, the vehicle 1340 may be an autonomous vehicle and equipped with an array of sensors 1344, a navigation system 1346, and a ride-service computing device 1348. In particular embodiments, a fleet of autonomous vehicles 1340 may be managed by the transportation management system 1360. The fleet of autonomous vehicles 1340, in whole or in part, may be owned by the entity associated with the transportation management system 1360, or they may be owned by a third-party entity relative to the transportation management system 1360. In either case, the transportation management system 1360 may control the operations of the autonomous vehicles 1340, including, e.g., dispatching select vehicles 1340 to fulfill ride requests, instructing the vehicles 1340 to perform select operations (e.g., head to a service center or charging/fueling station, pull over, stop immediately, self-diagnose, lock/unlock compartments, change music station, change temperature, and any other suitable operations), and instructing the vehicles 1340 to enter select operation modes (e.g., operate normally, drive at a reduced speed, drive under the command of human operators, and any other suitable operational modes).

In particular embodiments, the autonomous vehicles 1340 may receive data from and transmit data to the transportation management system 1360 and the third-party system 1370. Example of received data may include, e.g., instructions, new software or software updates, maps, 3D models, trained or untrained machine-learning models, location information (e.g., location of the ride requestor, the autonomous vehicle 1340 itself, other autonomous vehicles 1340, and target destinations such as service centers), navigation information, traffic information, weather information, entertainment content (e.g., music, video, and news) ride requestor information, ride information, and any other suitable information. Examples of data transmitted from the autonomous vehicle 1340 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1340, passengers may send/receive data to the transportation management system 1360 and/or third-party system 1370), and any other suitable data.

In particular embodiments, autonomous vehicles 1340 may also communicate with each other as well as other traditional human-driven vehicles, including those managed and not managed by the transportation management system 1360. For example, one vehicle 1340 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 1360 or third-party system 1370).

In particular embodiments, an autonomous vehicle 1340 may obtain and process sensor/telemetry data. Such data may be captured by any suitable sensors. For example, the vehicle 1340 may have aa Light Detection and Ranging (LiDAR) sensor array of multiple LiDAR transceivers that are configured to rotate 360°, emitting pulsed laser light and measuring the reflected light from objects surrounding vehicle 1340. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 1340. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 1340 may have optical cameras pointing in different directions. The cameras may be used for, e.g., recognizing roads, lane markings, street signs, traffic lights, police, other vehicles, and any other visible objects of interest. To enable the vehicle 1340 to "see" at night, infrared cameras may be installed. In particular embodiments, the vehicle may be equipped with stereo vision for, e.g., spotting hazards such as pedestrians or tree branches on the road. As another example, the vehicle 1340 may have radars for, e.g., detecting other vehicles and/or hazards afar. Furthermore, the vehicle 1340 may have ultrasound equipment for, e.g., parking and obstacle detection. In addition to sensors enabling the vehicle 1340 to detect, measure, and understand the external world around it, the vehicle 1340 may further be equipped with sensors for detecting and self-diagnosing the vehicle's own state and condition. For example, the vehicle 1340 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 1340 may build a 3D model of its surrounding based on data from its LiDAR, radar, sonar, and cameras, along with a pre-generated map obtained from the transportation management system 1360 or the third-party system 1370. Although sensors 1344 appear in a particular location on autonomous vehicle 1340 in FIG. 13, sensors 1344 may be located in any suitable location in or on autonomous vehicle 1340. Example locations for sensors include the front and rear bumpers, the doors, the front windshield, on the side panel, or any other suitable location.

In particular embodiments, the autonomous vehicle 1340 may be equipped with a processing unit (e.g., one or more CPUs and GPUs), memory, and storage. The vehicle 1340 may thus be equipped to perform a variety of computational and processing tasks, including processing the sensor data, extracting useful information, and operating accordingly. For example, based on images captured by its cameras and a machine-vision model, the vehicle 1340 may identify particular types of objects captured by the images, such as pedestrians, other vehicles, lanes, curbs, and any other objects of interest.

In particular embodiments, the autonomous vehicle 1340 may have a navigation system 1346 responsible for safely navigating the autonomous vehicle 1340. In particular embodiments, the navigation system 1346 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1346 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 1346 may use its determinations to control the vehicle 1340 to operate in prescribed manners and to guide the autonomous vehicle 1340 to its destinations without colliding into other objects. Although the physical embodiment of the navigation system 1346 (e.g., the processing unit) appears in a particular location on autonomous vehicle 1340 in FIG. 13, navigation system 1346 may be located in any suitable location in or on autonomous vehicle 1340. Example locations for navigation system 1346 include inside the cabin or passenger compartment of autonomous vehicle 1340, near the engine/battery, near the front seats, rear seats, or in any other suitable location.

In particular embodiments, the autonomous vehicle 1340 may be equipped with a ride-service computing device 1348, which may be a tablet or any other suitable device installed by transportation management system 1360 to allow the user to interact with the autonomous vehicle 1340, transportation management system 1360, other users 1301, or third-party systems 1370. In particular embodiments, installation of ride-service computing device 1348 may be accomplished by placing the ride-service computing device 1348 inside autonomous vehicle 1340, and configuring it to communicate with the vehicle 1340 via a wire or wireless connection (e.g., via Bluetooth). Although FIG. 13 illustrates a single ride-service computing device 1348 at a particular location in autonomous vehicle 1340, autonomous vehicle 1340 may include several ride-service computing devices 1348 in several different locations within the vehicle. As an example and not by way of limitation, autonomous vehicle 1340 may include four ride-service computing devices 1348 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 1348 may be detachable from any component of autonomous vehicle 1340. This may allow users to handle ride-service computing device 1348 in a manner consistent with other tablet computing devices. As an example and not by way of limitation, a user may move ride-service computing device 1348 to any location in the cabin or passenger compartment of autonomous vehicle 1340, may hold ride-service computing device 1348, or handle ride-service computing device 1348 in any other suitable manner. Although this disclosure describes providing a particular computing device in a particular manner, this disclosure contemplates providing any suitable computing device in any suitable manner.

Figure 14:
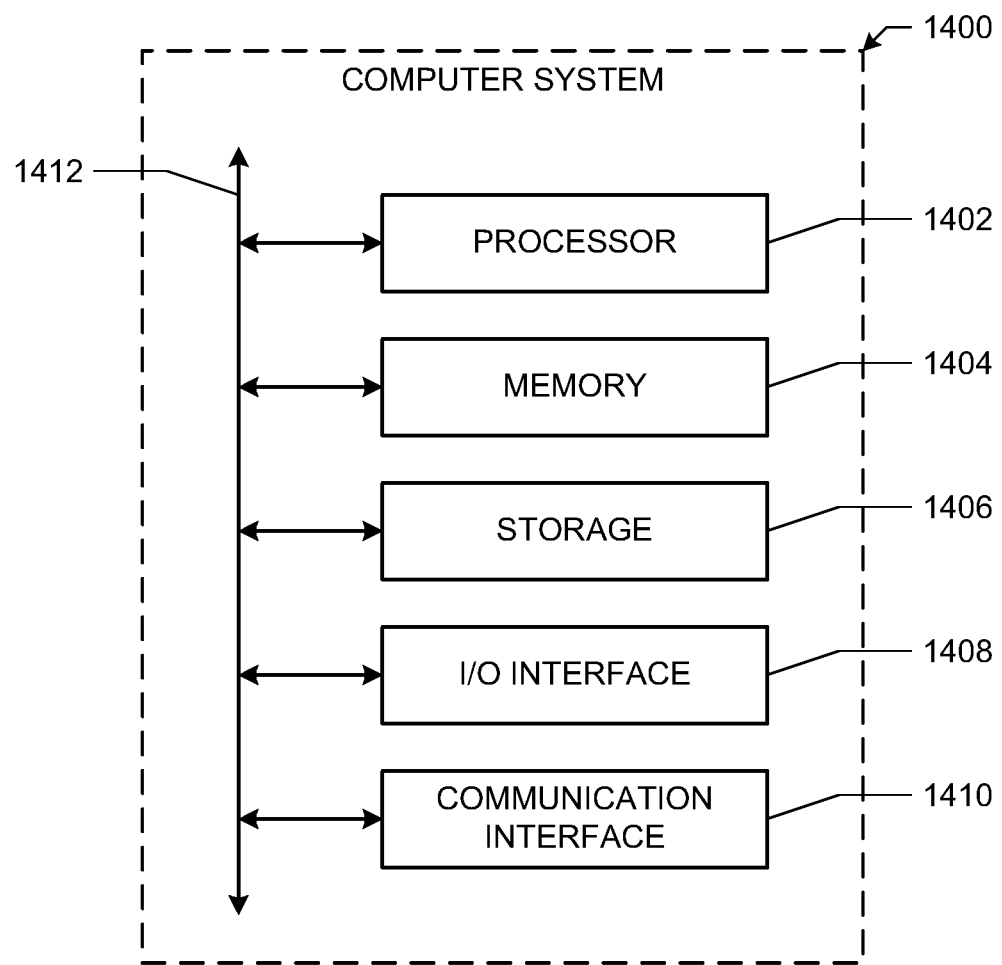
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide the functionalities described or illustrated herein. In particular embodiments, software running on one or more computer systems 1400 performs one or more steps of one or more methods described or illustrated herein or provides the functionalities described or illustrated herein. Particular embodiments include one or more portions of one or more computer systems 1400. Herein, a reference to a computer system may encompass a computing device, and vice versa, where appropriate. Moreover, a reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 that are to be operated on by computer instructions; the results of previous instructions executed by processor 1402 that are accessible to subsequent instructions or for writing to memory 1404 or storage 1406; or any other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs), be a multi-core processor, or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described in further detail below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate.

Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system associated with a vehicle:
   receiving sensor data, including at least an image, of an environment external to the vehicle generated by one or more sensors of the vehicle;
   identifying, based on the sensor data, one or more objects in the environment;
   generating, based on the one or more objects, a set of points that represent the environment, including transforming a spatial representation of the objects into a plurality of points by converting one or more bounding boxes representing the one or more objects into coordinates in a top-down view of the environment, wherein each object of the one or more objects includes one or more corresponding points in the set of points, and wherein the plurality of points represent only corners of a polygon in the top-down view for the one or more objects;
   generating a prediction for at least one of the one or more objects in the environment by processing the set of points; and
   causing the vehicle to perform one or more operations based on the prediction.

2. The method of claim 1, further comprising:
   generating one or more object representations that correspond to the one or more objects, wherein the one or more object representations comprises a classification of a respective one of the one or more objects, the spatial representation that represents a size and position of a respective one of the one or more objects, and a directional heading of a respective one of the one or more objects.

3. The method of claim 2, wherein generating, based on the one or more objects, the set of points further comprises:
   updating the set of points to include the plurality of points and one or more features associated with the plurality of points, wherein the features include the classification of a respective one of the one or more objects.

4. The method of claim 1, wherein the polygon has a size and position that correspond to the size and position of a respective one of the one or more objects.

5. The method of claim 4, further comprising:
   transforming a directional heading to an object heading of a respective one of the one or more objects in the top-down view; and
   storing the object heading of a respective one of the one or more objects in the top-down view as a feature associated with the plurality of points.

6. The method of claim 1, wherein the set of points is processed using a machine-learning model, wherein the machine-learning model comprises a PointNet.

7. The method of claim 6, wherein the prediction comprises a predicted trajectory of the at least one of the one or more objects, and wherein the prediction is generated based on output of the machine-learning model.

8. The method of claim 7, wherein the predicted trajectory comprises coordinates of one or more points to which the at least one of the one or more objects is predicted to move.

9. The method of claim 1, wherein the set of points comprises a first plurality of points that represent an object in the environment at a first time and a second plurality of points that represent the object at a second time,
   wherein the prediction for the at least one of the one or more objects is based on a speed of the at least one object, and wherein the speed is determined based on at least one distance between at least one of the first plurality of points and a corresponding at least one of the second plurality of points.

10. The method of claim 1, wherein transforming the spatial representation converts three-dimensional points representing the one or more objects into two-dimensional points in the top-down view.

11. The method of claim 1, wherein generating, based on the one or more objects, further comprises:
   identifying, in a map database, one or more map features that are in the environment;
   transforming coordinates of the map features to a corresponding plurality of points;
   associating a classification of the map features with the corresponding plurality of points; and including the corresponding plurality of points in the set of points.

12. A system comprising:
one or more processors and one or more computer-readable non-transitory storage media coupled to the one or more processors, the one or more computer-readable non-transitory storage media comprising instructions operable, when executed by the one or more processors, to cause the system to:
receive sensor data of an environment external to a vehicle generated by one or more sensors of the vehicle;
identify, based on the sensor data, one or more objects in the environment;
generate, based on the one or more objects, a set of points that represent the environment, including transforming a spatial representation of the objects into a plurality of points by converting one or more bounding boxes representing the one or more objects into coordinates in a top-down view of the environment, wherein each object of the one or more objects includes one or more corresponding points in the set of points, and wherein the plurality of points represent only corners of a polygon in the top-down view for the one or more objects;
generate a prediction for at least one of the one or more objects in the environment by processing the set of points; and
cause the vehicle to perform one or more operations based on the prediction.

13. The system of claim 12, wherein the instructions are further operable when executed by the one or more processors to cause the system to:
generate one or more object representations that correspond to the one or more objects, wherein the one or more object representations comprises a classification of a respective one of the one or more objects, the spatial representation that represents a size and position of a respective one of the one or more objects, and a directional heading of a respective one of the one or more objects.

14. The system of claim 13, wherein to generate the set of points, the instructions are further operable when executed by the one or more processors to cause the system to:
update the set of points to include the plurality of points and one or more features associated with the plurality of points, wherein the features include the classification of a respective one of the one or more objects.

15. The system of claim 12, wherein the polygon has a size and position that correspond to the size and position of a respective one of the one or more objects.

16. The system of claim 15, wherein the instructions are further operable when executed by the one or more processors to cause the system to:
transform a directional heading to an object heading of a respective one of the one or more objects in the top-down view; and
store the object heading of a respective one of the one or more objects in the top-down view as a feature associated with the plurality of points.

17. One or more computer-readable non-transitory storage media embodying software including instructions that is operable when executed, cause one or more processors to perform operations comprising:
receiving sensor data of an environment external to a vehicle generated by one or more sensors of the vehicle;
identifying, based on the sensor data, one or more objects in the environment;
generating, based on the one or more objects, a set of points that represent the environment, including transforming a spatial representation of the objects into a plurality of points by converting one or more bounding boxes representing the one or more objects into coordinates in a top-down view of the environment, wherein each object of the one or more objects includes one or more corresponding points in the set of points, and wherein the plurality of points represent only corners of a polygon in the top-down view for the one or more objects;
generating a prediction for at least one of the one or more objects in the environment by processing the set of points; and
causing the vehicle to perform one or more operations based on the prediction.

18. The storage media of claim 17, wherein the instructions, when executed, further cause the one or more processors to perform operations comprising:
generating one or more object representations that correspond to the one or more objects, wherein the one or more object representations comprises a classification of a respective one of the one or more objects, the spatial representation that represents a size and position of a respective one of the one or more objects, and a directional heading of a respective one of the one or more objects.

19. The storage media of claim 18, wherein generating, based on the one or more objects, the set of points further comprises:
updating the set of points to include the plurality of points and one or more features associated with the plurality of points, wherein the features include the classification of a respective one of the one or more objects.

20. The storage media of claim 17, wherein the polygon has a size and position that correspond to the size and position of a respective one of the one or more objects.

* * * * *